(12) United States Patent
Notaro et al.

(10) Patent No.: US 9,337,636 B2
(45) Date of Patent: May 10, 2016

(54) MODULAR FASTENING SYSTEM

(71) Applicants: Frank Notaro, Southold, NY (US);
Samuel J. Notaro, Syracuse, NY (US)

(72) Inventors: Frank Notaro, Southold, NY (US);
Samuel J. Notaro, Syracuse, NY (US)

( * ) Notice: Subject to any disclaimer, the term of this patent is extended or adjusted under 35 U.S.C. 154(b) by 0 days.

(21) Appl. No.: 14/807,456

(22) Filed: Jul. 23, 2015

(65) Prior Publication Data

US 2015/0362095 A1  Dec. 17, 2015

Related U.S. Application Data

(63) Continuation-in-part of application No. 13/527,171, filed on Jun. 19, 2012.

(51) Int. Cl.
| | | |
|---|---|---|
| *F16L 3/08* | (2006.01) | |
| *H02G 3/32* | (2006.01) | |
| *F16L 3/223* | (2006.01) | |
| *F16L 3/10* | (2006.01) | |

(52) U.S. Cl.
CPC *H02G 3/32* (2013.01); *F16L 3/223* (2013.01); *F16L 3/1066* (2013.01)

(58) Field of Classification Search
CPC ............... F16L 3/222; F16L 3/22; F16L 3/13; F16L 3/1066; F16L 3/223; A47F 7/022; F16B 7/0433; H02G 3/32
USPC .......... 248/53, 66, 65, 73, 74.2, 74.1, 220.21, 248/221.4, 221.11, 222.13, 224.7; 403/34, 403/345, 347, 349, 44, 359.1, 361; 138/111, 112, 114
See application file for complete search history.

(56) References Cited

U.S. PATENT DOCUMENTS

| | | | | |
|---|---|---|---|---|
| 2,577,120 A | * | 12/1951 | Franz | F28D 1/00 138/111 |
| 3,160,175 A | * | 12/1964 | Laemmle | B65D 59/06 138/109 |
| 3,856,246 A | * | 12/1974 | Sinko | F16L 3/222 138/112 |
| 3,964,707 A | * | 6/1976 | Lewis | F16L 1/028 248/49 |
| 4,099,626 A | * | 7/1978 | Magnussen, Jr. | A47B 73/006 211/194 |
| 4,306,697 A | * | 12/1981 | Mathews | F16L 3/222 248/68.1 |
| 4,431,152 A | * | 2/1984 | Reed, Jr. | H02G 3/0683 248/65 |
| 4,618,114 A | * | 10/1986 | McFarland | F16L 3/13 248/220.21 |
| 5,316,246 A | * | 5/1994 | Scott | A61M 5/1418 248/68.1 |
| 6,061,880 A | * | 5/2000 | Senninger | E03C 1/021 24/335 |

(Continued)

*Primary Examiner* — Kimberly Wood
(74) *Attorney, Agent, or Firm* — Sorell, Lenna & Schmidt, LLP

(57) ABSTRACT

A modular fastening kit is provided. The kit includes at least one first connecting unit having a first end including a male connector and an opposite second end including a female connector. The kit includes at least one second connecting unit having a first end including a female connector and an opposite second end including a female connector. The kit includes at least one third connecting unit having a first end extending along a first axis and including a male connector and an opposite second end extending along a second axis and including a male connector. The first axis extends transverse to the second axis. The male connectors each have an exterior fluted surface and the female connectors each have an interior fluted surface. The female connectors are each configured and dimensioned to removably receive one of the male connectors. Systems and methods are disclosed.

19 Claims, 31 Drawing Sheets

(56) References Cited

U.S. PATENT DOCUMENTS

| | | | | |
|---|---|---|---|---|
| 6,109,569 A * | 8/2000 | Sakaida | ............... | F16L 3/222 248/316.7 |
| 6,378,811 B1 * | 4/2002 | Potter | ............... | F16L 3/222 248/49 |
| 7,828,251 B2 * | 11/2010 | Tollefson | ............... | E04B 5/48 248/49 |
| 7,942,371 B1 * | 5/2011 | McCoy | ............... | H02G 9/02 248/68.1 |
| 8,020,259 B2 * | 9/2011 | Ho | ............... | F16L 3/222 24/129 R |
| 8,342,474 B2 * | 1/2013 | Gilbreath | ............... | F16L 3/222 165/162 |
| 2008/0105796 A1 * | 5/2008 | Nix | ............... | F16L 3/1033 248/73 |
| 2008/0296443 A1 * | 12/2008 | Lunitz | ............... | H02G 3/32 248/65 |
| 2013/0336708 A1 * | 12/2013 | Burgess | ............... | E04G 11/062 403/122 |

* cited by examiner

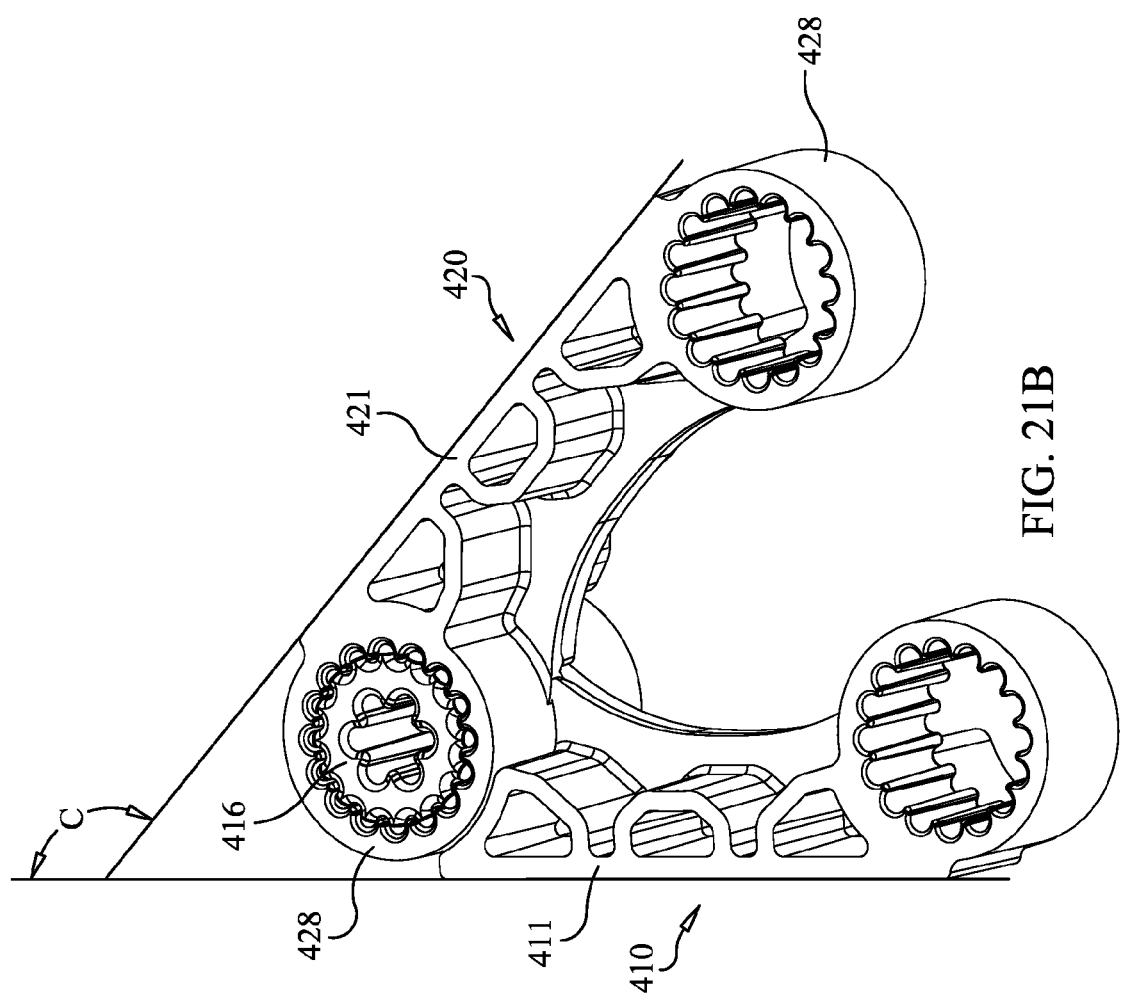

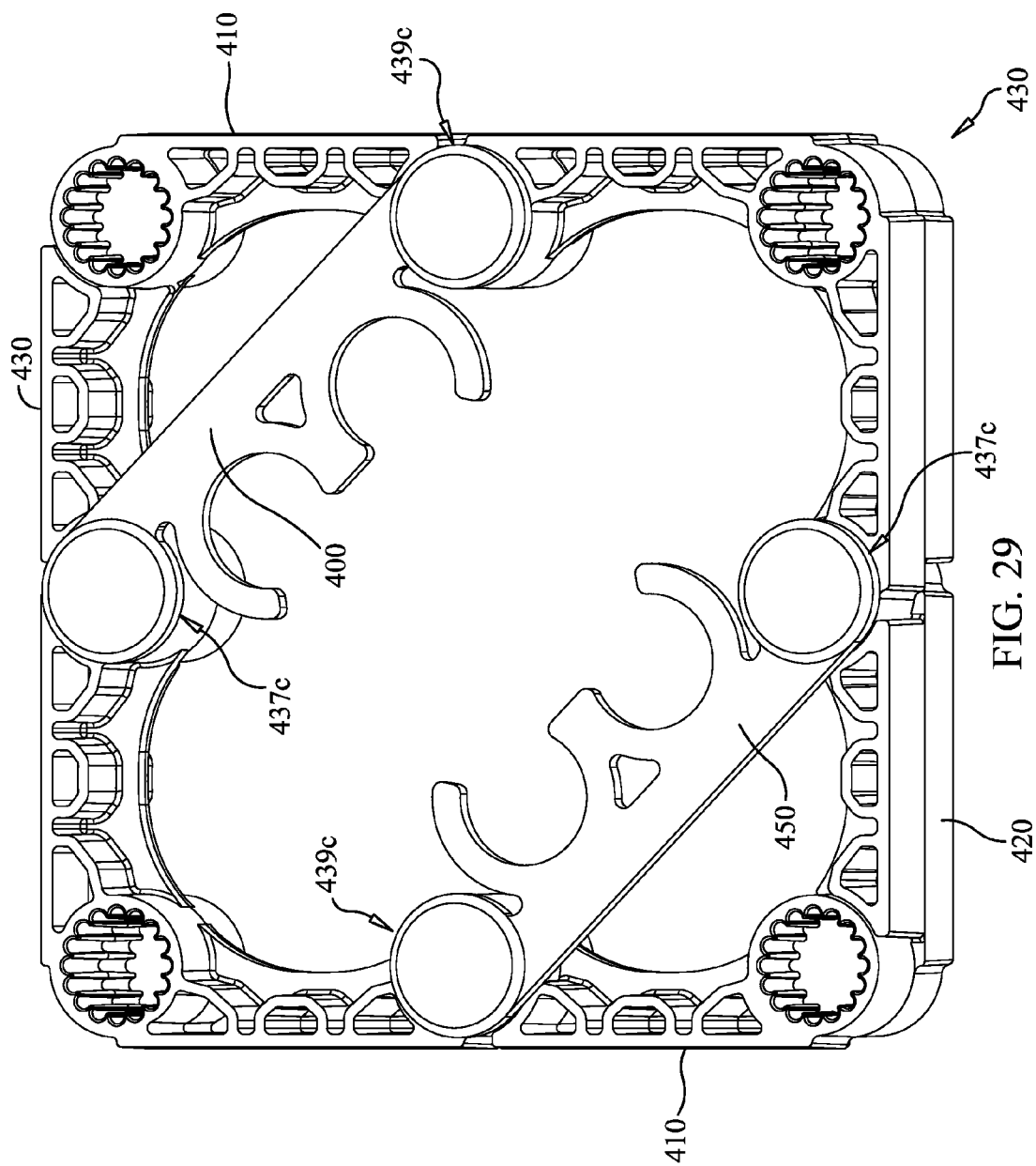

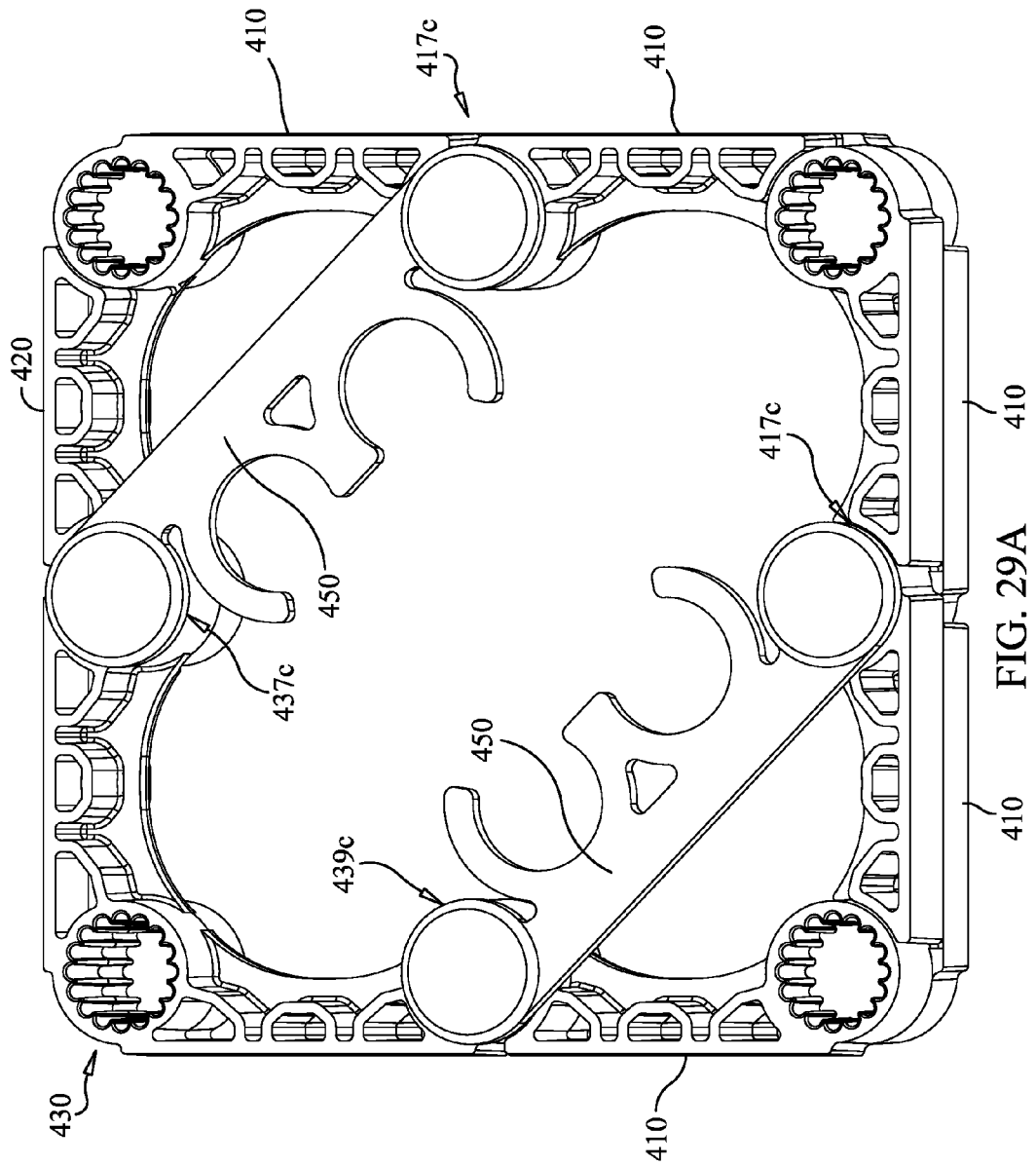

MODULAR FASTENING SYSTEM

TECHNICAL FIELD

The present disclosure generally relates to brackets for supporting pipes and/or cables, and more particularly to a modular system with an adjustable configuration to fit various hanging and enclosure requirements.

BACKGROUND

The growth of the use of telecommunication and electronic devices in homes and offices has resulted in an increase in the number of cables and wires that need to be used to connect the devices. Buildings typically need to provide support structures in walls, ceilings and various enclosures to support electrical as well as plumbing used in new construction or in remodeling of offices and homes. In particular, it is necessary to support multiple cables, wires harnesses, hot and cold-water plumbing as well as heating pipes used in different building structures.

For example, U.S. Pat. No. 6,572,058 to Gerardro is directed to a multiple cable support bracket and discloses a support member having a first portion which includes a bracket portion that is preferably configured to have a vertical orientation. The first bracket portion includes one or more openings through which screws, bolts or nails may be driven to secure the bracket to an adjacent structure. A cable support arm extends outward from the bracket portion. This portion also has a further portion which extends parallel to the bracket portion and a further segment which extends back toward the bracket portion to form a cavity within which one or more cables and/or wires may be located. The preferred bracket support of the Gerardo patent also preferably includes a centrally located spacer arm that may be utilized to provide further support for wires and/or cables located within the cavity formed by the support arm while also separating the various cables and/or wires located with the support member.

U.S. Pat. No. 8,183,471 to Handler discloses a cable raceway including top and bottom walls, rear and front walls and a divider extending along substantially the entire length of the raceway. The divider extends in the direction between the top and bottom walls of the raceway. The raceway is comprised of a rear module of the raceway and the next module outward is a front module completing the preceding module passages. A cover over the front module passage completes that passage.

However, there is yet need for a fastening system for supporting electrical/computer wires and cables, hot and cold water pipes, duct work, gas conduits and other electrical or fluid conduits, which can be conveniently used in a variety of different building enclosures. In particular, what is needed is a modular system with multiple components which can be connected in different configurations and adapted to fit into various enclosures, soffit raceways, cabinets, wall units, under modular and stationary desk units, crown molding enclosures, behind drywalls as well as concealed in other finishing elements, in lieu of traditional building materials.

SUMMARY

A modular fastening kit is provided. The kit includes at least one first connecting unit having a first end including a male connector and an opposite second end including a female connector. The kit includes at least one second connecting unit having a first end including a female connector and an opposite second end including a female connector. The kit includes at least one third connecting unit having a first end extending along a first axis and including a male connector and an opposite second end extending along a second axis and including a male connector. The first axis extends transverse to the second axis. The male connectors each have an exterior fluted surface and the female connectors each have an interior fluted surface. The female connectors are each configured and dimensioned to removably receive one of the male connectors.

BRIEF DESCRIPTION OF THE DRAWINGS

The present disclosure will become more readily apparent from the specific description accompanied by the following drawings, in which:

FIG. 21B is a perspective, top view of components of the kit shown in FIG. 19;

FIG. 29 shows components of the kit shown in FIG. 19 that are assembled to form a frame or enclosure;

FIG. 29A shows components of the kit shown in FIG. 19 that are assembled to form a frame or enclosure.

DETAILED DESCRIPTION

Figure 1:
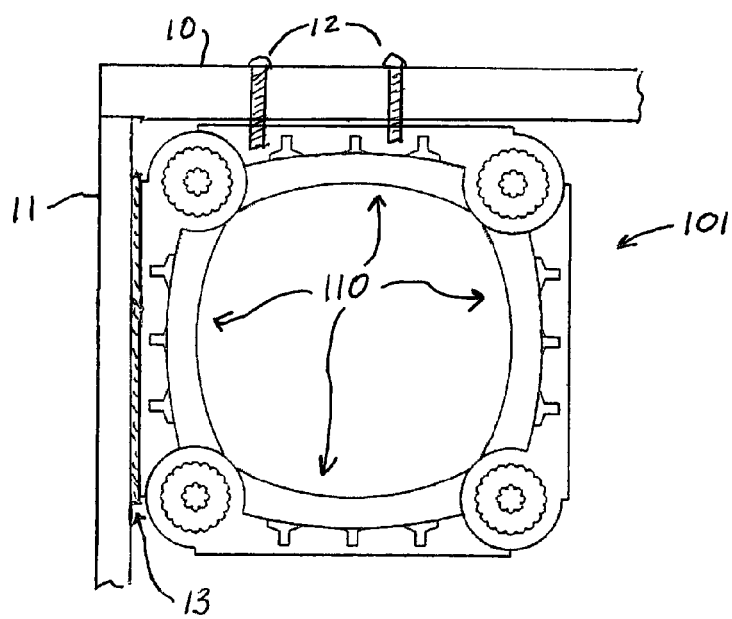
FIG. 1 illustrates frames of made using one embodiment of a modular fastening system in accordance with the present disclosure.

The exemplary embodiments of the modular component system are discussed in terms of building components and more particularly, in terms of a building fastening system for new construction and remolding of offices and home construction. It is envisioned that professional builders as well as do-it-yourself construction projects can use the modular component system. For example, the modular component system and method of use can include modular interconnection pieces that are arrangeable at multiple angles so that the system can be used in large construction projects as well as small construction projects.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior". It will be understood that any numerical range recited herein is intended to include all sub-ranges within that range.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The following discussion includes a description of a modular fastening system and related methods of employing the modular fastening system in accordance with the principles of the present disclosure. Alternate embodiments are also disclosed. Reference will now be made in detail to the exemplary embodiments of the present disclosure, which are illustrated in the accompanying figures. Turning now to FIGS. 1-13, there are illustrated components of one embodiment of a modular fastening system in accordance with the principles of the present disclosure.

Figure 2:
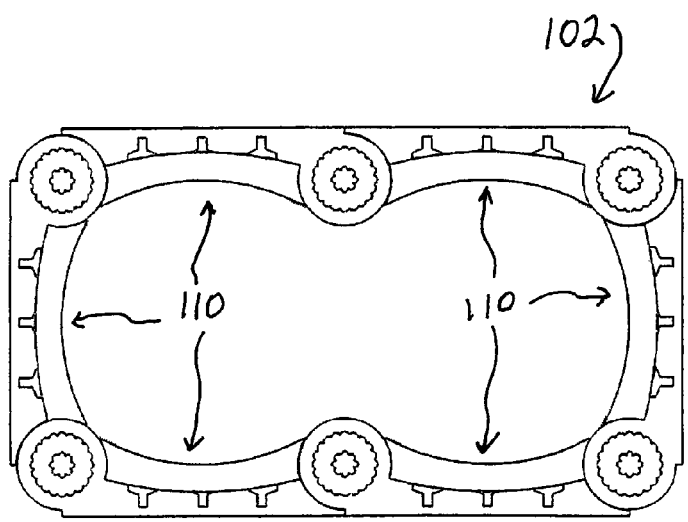
FIG. 2 illustrates frames of the modular fastening system of the present disclosure.

Referring now to FIGS. 1 and 2, connecting units 110 (described more fully below) may be assembled in various configurations such as triangles, trapezoids, polygrams etc. To form these shapes at least two modular components are connected together at particular angles in order to achieve the desired configuration. For example, square frame 101 can be formed by connecting four substantially straight connecting units 110 to form a square shape. In the alternative, frame 101 can be formed by connecting two triangle portions to form the square. Frame 102 can be formed by connecting six connecting units 110 to form a rectangular shape. Alternatively, three connecting units 110 can be connected to form a triangular shape. Other shapes for the frames can include, for example, trapezoids, parallelograms and various other configurations.

Referring to FIGS. 1 and 2, the frames 101, 102 can be fixed underneath a construction member such as a soffit 10 and/or to a sideboard or drywall 11 by means of any appropriate fasteners 12 such as screws, nails, etc. Alternatively, the frames 101, 102 can be secured to the construction member by a suitable construction adhesive, Velcro®, clips, straps, adhesive tape, and any combination thereof. For example, the system can be fastened to building studs/framing to brace wiring and/or water pipes to the framing of the building. Once in place the fastened system attaching wiring, pipes or other essential infrastructure to the building frame can then be concealed with drywall or other building materials. In particular as shown in FIG. 1 Velcro® type hook and loop strips 13, can be employed as a means of attaching a frame to a construction member. Velcro® type hook and loop strips can also be used to attach crown molding, drywall, or a panel over the modular fastening system holding plumbing or electrical harnesses so as to hide the structure.

Figure 9:
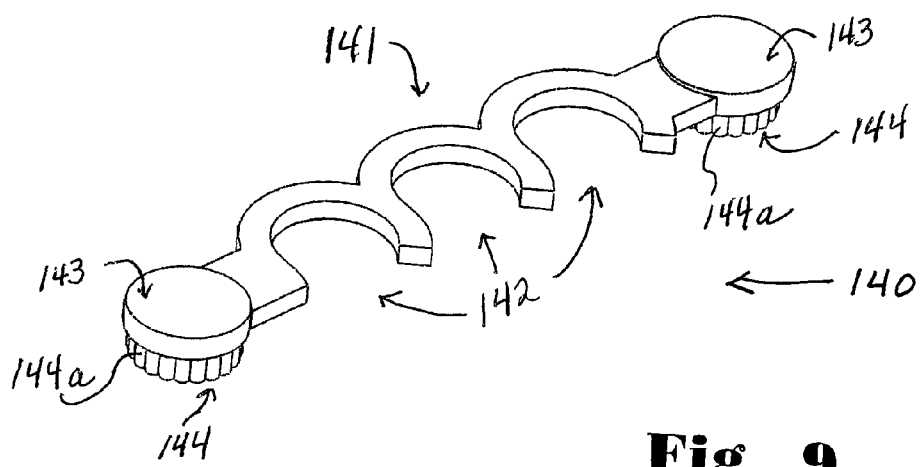
FIG. 9 is a perspective view of a support bracket of the modular fastening system.
Figure 10:
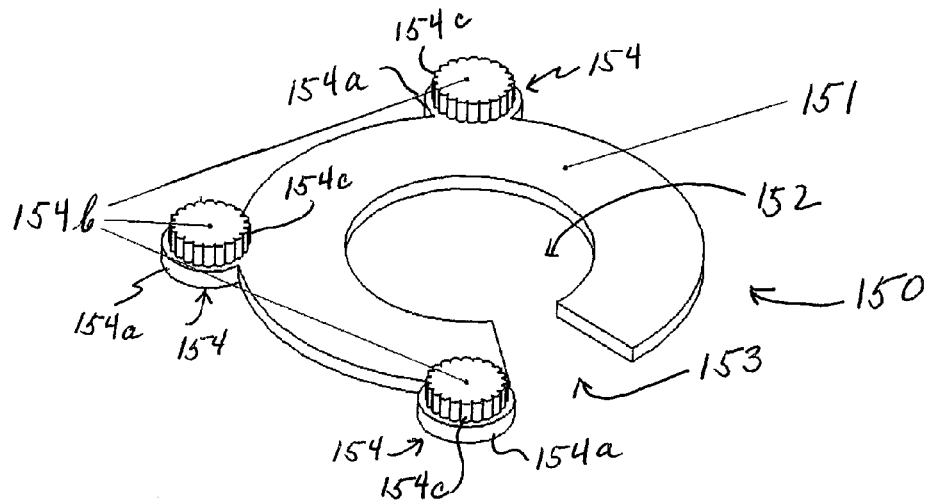
FIG. 10 is a perspective view of a large pipe support bracket of the modular fastening system.

As described further in FIG. 9 and FIG. 10, various types of brace components can be used in frames 101 and 102 that are configured to connect across the unit either diagonally, vertically, horizontally or at a particular angle in order to provide support for the plumbing or electrical harnesses supported by the fastening system.

Figure 3:
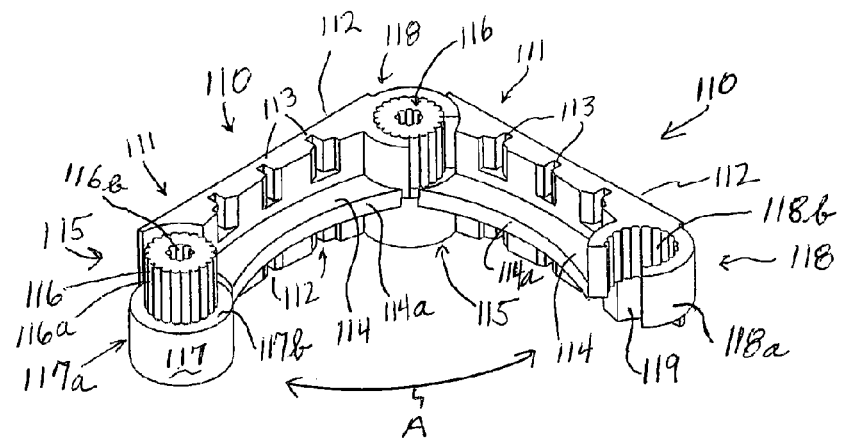
FIG. 3 is a perspective view of two joined connecting units of the modular fastening system.

Referring now to FIG. 3, two connecting units 110 are illustrated in a joined configuration. The connecting units 110 are formed as integral single piece units by molding, casting and/or machining. Each connecting unit includes an arm 111 with opposite end portions 115 and 118. Arm 111 is an elongated portion including a back 112 optionally having a plurality of grooves 113. A ridge 114 extends laterally from the back 112 and has an inward facing edge 114a which can be rectilinear or curved (as shown). The first end portion 115 includes a first cylindrical portion 116, a male connector, having a fluted outer circumferential surface 116a possessing a plurality of vertical grooves, and an axial bore 116b defined by a fluted interior surface and serving a female port for the engagement of a cap member 160, described below. The first end portion 115 also includes a second cylindrical portion 117 having a smooth circumferential outer surface 117a. The diameter of the second cylindrical portion 117 is greater than that of the first cylindrical portion 116 so as to define an annular abutment surface 117b. The second cylindrical portion further includes an axial recess 117c defined by a fluted interior surface (shown in FIG. 8). The first cylindrical portion 116 extends from a horizontal midline of the connecting unit 110 to the top, (as shown) and the second cylindrical portion extends from the midline to the bottom and is coaxial with the first cylindrical position.

The second end portion 118 is a C-shaped member, a female connector, having a smooth outer surface 118a and a fluted interior surface 118b. The C-shaped member 118 extends from about the horizontal (as shown) midline of the connecting unit 110 to the top thereof. The back 112 of the arm terminates in a curved end surface 119 in the vicinity of the second end portion 118.

The connecting units 110 can be assembled by inserting the fluted first cylindrical portion 116 at the first end 115 of one connecting unit 110 into the C-shaped second end portion 118 of another connecting unit. The fluted exterior surface 116a of one connecting unit 110 is configured to correspondingly engage the interior fluted surface 118b of the C-shaped second end portion so as to prevent relative rotation of the two connecting units when assembled. However, because the fluted surfaces contain a plurality of vertical grooves and ridges, the orientation of the two connecting units can be selected during the assembly process so that the arms 111 can be configured in a variety of different angular relationships. As shown, angle A defined by the two arms 111 can be almost any degrees with the only limitation on the gearing of the fluted surfaces. That is, the fluted surfaces can be designed so that moving the connecting portion from one fluted surface to an adjacent fluted surface creates a new structure having a defined change in degrees. The more ridges in the fluted surface, the greater the number of different degrees that can be created. For example, if the fluted surface has only four ridges located at 90 degrees apart, the connectors that connect to the fluted piece would be able to be form angles of 90, 180, and 270 degrees between components. Doubling the number of ridges on the fluted piece would double the number of angles that can be achieved. Increasing the number of ridges on the connector directly increases the number of possible angles that can be achieved by the fastening component system.

Figures 4, 5:
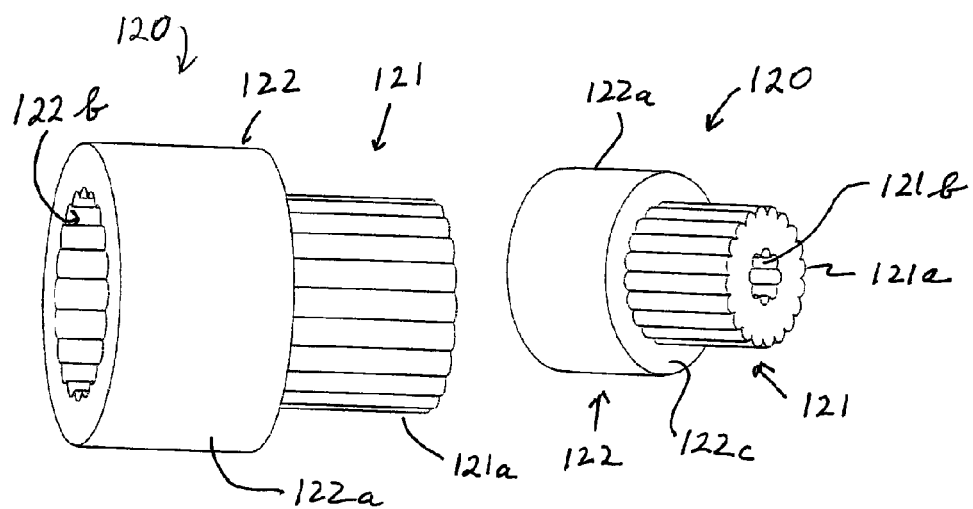
FIG. 4 is a perspective view of an adapter component of the modular fastening system.
FIG. 5 is a perspective view of an adapter component of the modular fastening system.

Referring now to FIGS. 4 and 5, an adapter 120 includes a first cylindrical portion 121 including an exterior circumferential fluted surface 121a and an axial bore 121b defined by an interior fluted surface and serving as a female port for the engagement of a cap member 160 as described below. Second cylindrical portion 122 has a circumferential smooth exterior surface 122a and an axial recess 122b defined by an interior fluted surface. The second cylindrical portion 122 is coaxially aligned with the first cylindrical portion 121 and is a larger diameter so as to define an annular abutment 122c. The adapter is preferably of monolithic piece construction and can be fabricated from any of the materials described below by any of the methods described below.

Figure 6:
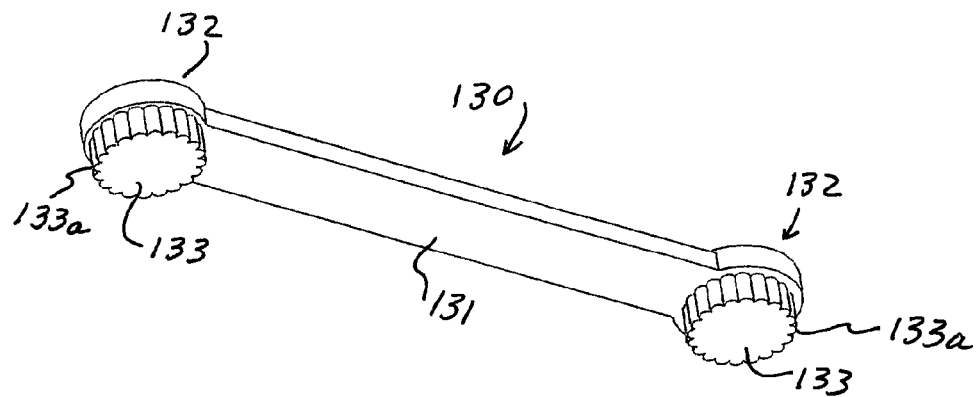
FIG. 6 is a perspective view of a bracing component of the modular fastening system.

FIG. 6 is a brace 130 and includes a rectilinear bar 131 and opposite end portions 132 each including a cylindrical male connector 133 having a circumferential fluted surface 133a. Male connector 133 is configured to engage a female reception port such as axial recess 122b of the adapter 120 or C-shaped end portion 118 or axial recess 117c of the second cylindrical portion 117 of the connecting unit 110. The brace 130 is preferably of monolithic piece construction and can be fabricated from any of the materials described below by any of the methods described below.

Figure 7:
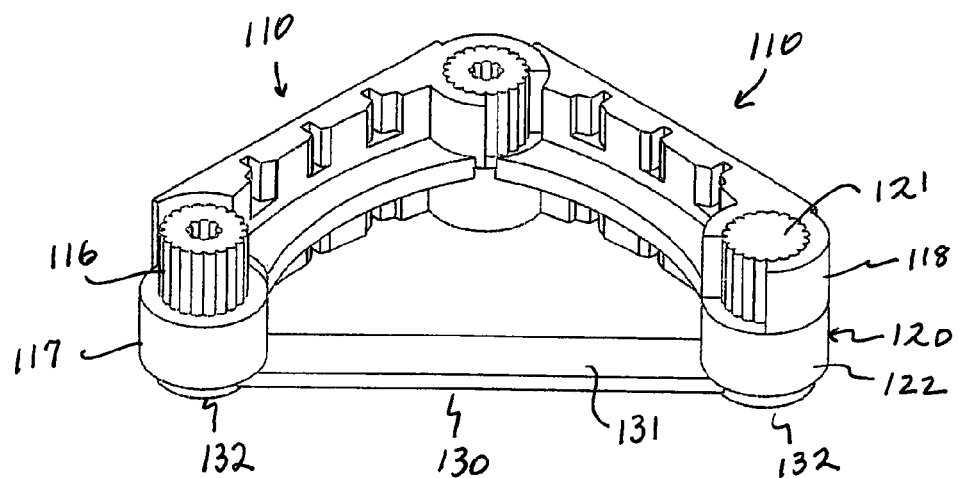
FIG. 7 is a perspective view illustrating the bracing component assembled with the joined connecting units.
Figure 8:
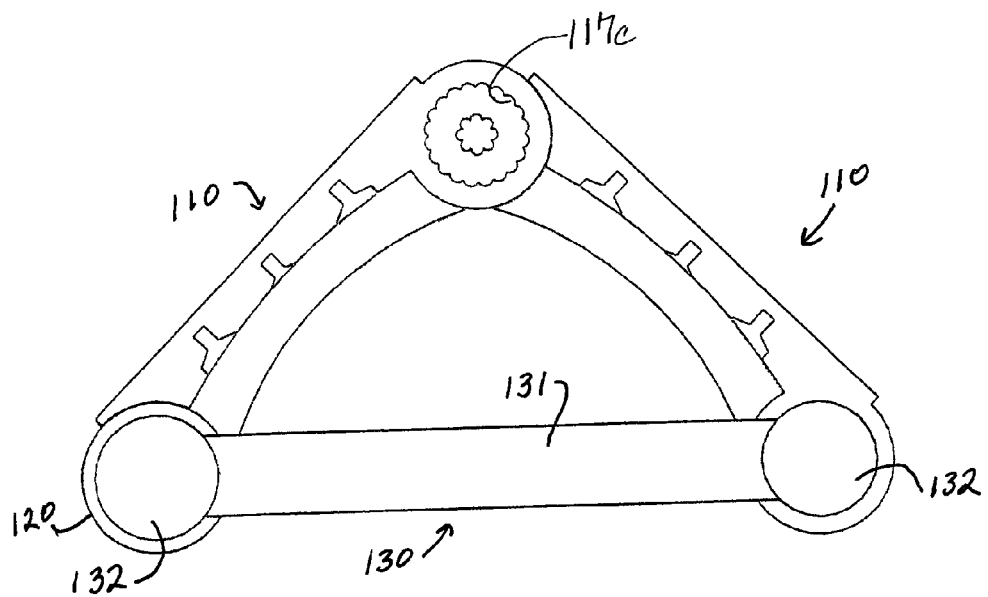
FIG. 8 is a bottom view of the assembled components of FIG. 7.

Referring now to FIGS. 7 and 8, a braced frame is illustrated wherein two connecting units are connected to each other as shown in FIG. 3. Adapter 120 is engaged with the C-shaped second end portion 118 of one of the connecting units such that the male connector, i.e., fluted cylindrical portion 121 of the adapter is engaged in the interior of the C-shaped portion defined by fluted surface 118b. The brace 130 extends from the first end portion of one connecting member 110 to the second end portion of the other connecting member 110. As can be seen, the male connector 132 at one end of the brace 130 is engaged in the, female port, i.e. fluted recess 117c of the second cylindrical portion 117 of one connecting member 110 and the male connector 132 at the other end of the brace 130 is engaged in the female part, i.e., fluted axial recess 122b (FIG. 4) of the adapter 120, which is engaged with the second end portion of the other connecting member 110, as mentioned above.

Referring to FIG. 9, support bracket 140 includes a middle support section 141 and opposite end portions 143, each end portion including a male connector 144 having a circumferential fluted surface 144a which is configured and dimensioned to engage a female reception port such as axial recess 122b (FIG. 4) of the adapter 120 (FIG. 4) or C-shaped end portion 118 (FIG. 3) or axial recess 117c (FIG. 8) of the second cylindrical portion 117 (FIG. 3) of the connecting unit 110 (FIG. 3). The middle support section 141 includes at least one, and preferably several hook portions 142 for supporting wires, cables, tubes, pipe or other electrical or fluid conduits. The hook portions 142 can be C-shaped, as shown in FIG. 9. Alternatively, the hook portions 142 can possess a substantially rectangular or triangular configuration, i.e., having a crenellate or sawtooth structure. In this embodiment the bracket support 140 can include 3 hook portions. In another embodiment the bracket support 140 can include two or more groups of hook portions, each group including from 1 to 5 hook portions, the groups being spaced apart from each other along the length of the middle support section 141. The support bracket 140 is preferably of single piece construction and can be fabricated from any of the materials described below by any of the methods described below.

Referring now to FIG. 10, large pipe support bracket 150 comprises a body 151 defining a central opening 152 and a gap 153 so as to provide body 151 with a C-shaped configuration. Large pipe support bracket 150 includes one or more projections 154 extending outward from the circumferential periphery of the body 151. Each projection 154 includes a base portion 154a having a smooth circumferential surface and a male connector 154b having a fluted circumferential surface 154c which is configured and dimensioned so as to engage a female reception port such as axial recess 122b (FIG. 4) of the adapter 120 (FIG. 4) or C-shaped end portion 118 (FIG. 3) or axial recess 117c (FIG. 8) of the second cylindrical portion 117 (FIG. 3) of the connecting unit 110 (FIG. 3). The central opening 152 is configured and dimensioned so as to accommodate a large pipe or tube disposed therethrough and typically has a diameter of from about 1 inch to about 3 inches, although dimensions outside of this range can be employed whenever appropriate. The large pipe support bracket 150 is preferably of monolithic piece construction and can be fabricated from any of the materials described below by any of the methods described below.

Figures 11, 12:
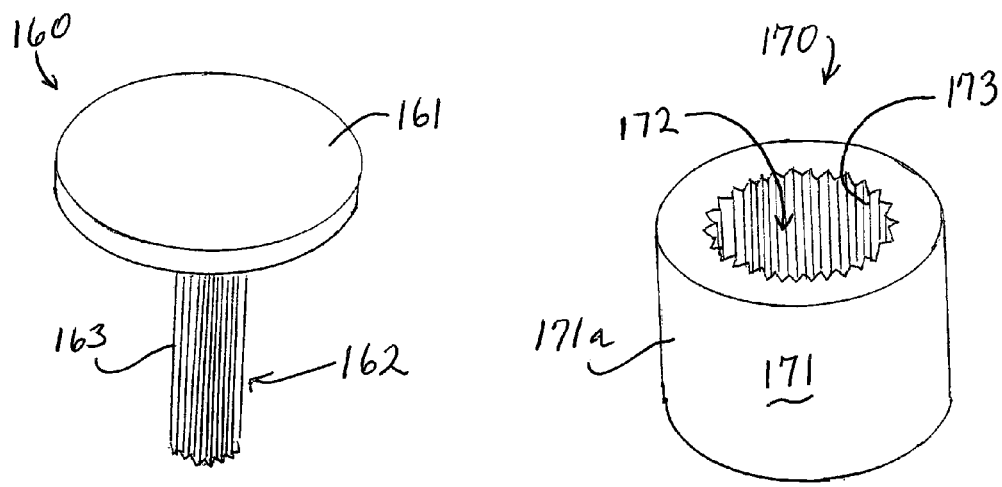
FIG. 11 is a perspective view of a cap member of the modular fastening system.
FIG. 12 is a perspective view of a collar of the modular fastening system.

Referring to FIG. 11, a cap member 160 includes a flat, disk shaped top surface 161 and an elongated axially extending male connector 162 having a fluted surface 163. The male connector 162 is configured and dimensioned so as to engage female port 116b (FIG. 3) of the connecting unit 110 (FIG. 3) or the female port 121b (FIG. 5) of the adapter 120 (FIG. 5). The cap member 160 is preferably of monolithic single piece construction and can be fabricated from any of the materials described below by any of the methods described below.

Referring to FIG. 12, collar 170 includes a cylindrical body having a smooth circumferential outer surface 171a and an axial channel 172 defined by a fluted interior surface 173. The axial channel 172 serves as a female port which is configured and dimensioned so as to engage any of the male connectors 116 (FIG. 3), 121 (FIG. 5), 133 (FIG. 6), 144 (FIG. 9), or 154b (FIG. 10). The collar 170 is preferably of monolithic piece construction and can be fabricated from any of the materials described below by any of the methods described below.

The components of the modular fastener system can be assembled and packaged in the form of a kit containing at least about two and preferably from about six to twelve connecting units 110 (FIG. 3), at least two and preferably four to eight adapters 120 (FIG. 5), at least one and preferably two to four braces 130 (FIG. 6), at least one and preferably two to four support brackets 140 (FIG. 9), at least one and preferably two to four large pipe support brackets 150 (FIG. 10), at least two and preferably four to eight caps 160 (FIG. 11), and at least two and preferably four to eight collars 170 (FIG. 12). This is one embodiment of the kit but it is within the scope of the present disclosure that different size kits can be assembled. In addition, it is also within the scope of this disclosure that different kits can be complied according to the particular use. For example, kits designed to support wires under a desk can include angled pieces, tubing and attachable brackets for fastening the system to the underside of the desk.

The connecting units typically can be from three to five inches in length and from about ¾ inch to about one inch in width. To use the modular system of the present disclosure, the user first determines the size and configuration of a frame to be made in accordance with the space available for its location and the loading of cables, wires, pipes, tubes, etc. it is required to support. The user then assembles a frame by joining the connecting units end to end. An important feature of the present disclosure is that the fluted surfaces of the male connectors and female ports allows the user to create a variety of frame configurations because the joints between the connecting units can be set at angles ranging from 15 degrees to 180 degrees. The frame can be attached to the construction member (e.g., a soffit, wallboard, etc.) by any of the means mentioned above such as with individual fasteners, adhesive, Velcro® strips, etc. Bracing and brackets, caps and collars can be selected as needed and assembled with the frame. Typically, part of the frame is attached to the construction member and the remainder of the frame is constructed around the cables, wires, pipes and tubing.

Figure 13:
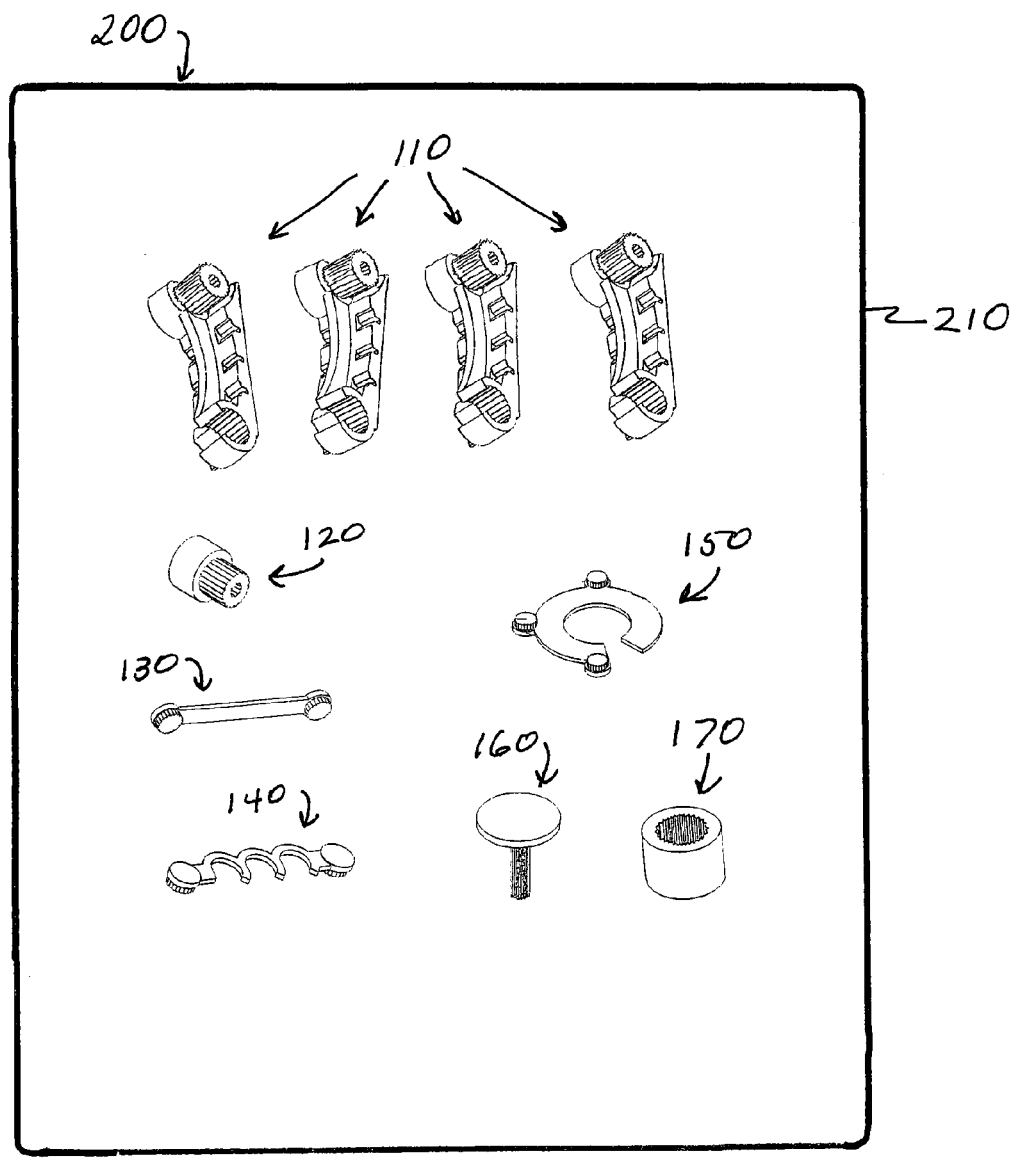
FIG. 13 illustrates a kit including the modular fastening system of the present disclosure.

Referring now to FIG. 13 a kit 200 includes the modular fastening system of the packaged within a container 210, which can be a soft container, such as a plastic or fabric bag, or a hard container such as a metal, wood, or hard plastic box. The packaged kit includes at least two and optionally four to twelve connecting units 110, at least one and optionally two to four support brackets 140 and at least one, and optionally two to four large pipe support brackets 150. Kit 200 can also include one or more adapters 120, one or more brace members 130, one or more caps 160 and one or more collars 170.

The kit 200 can optionally also include attachment devices such as screws, Velcro® strips and adhesive.

Figure 14:
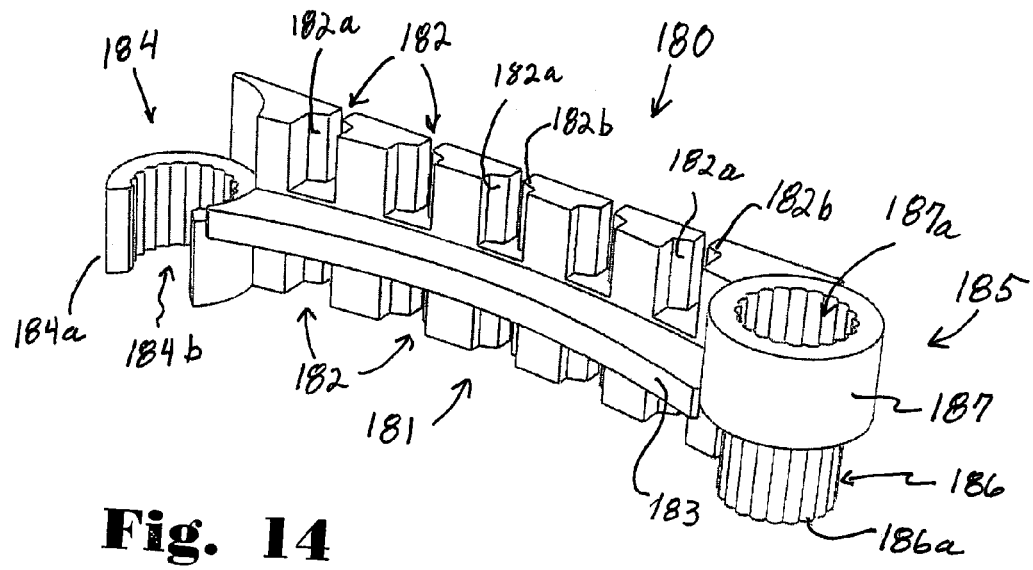
FIG. 14 is a perspective view of a base unit of the modular fastening system.
Figure 15:
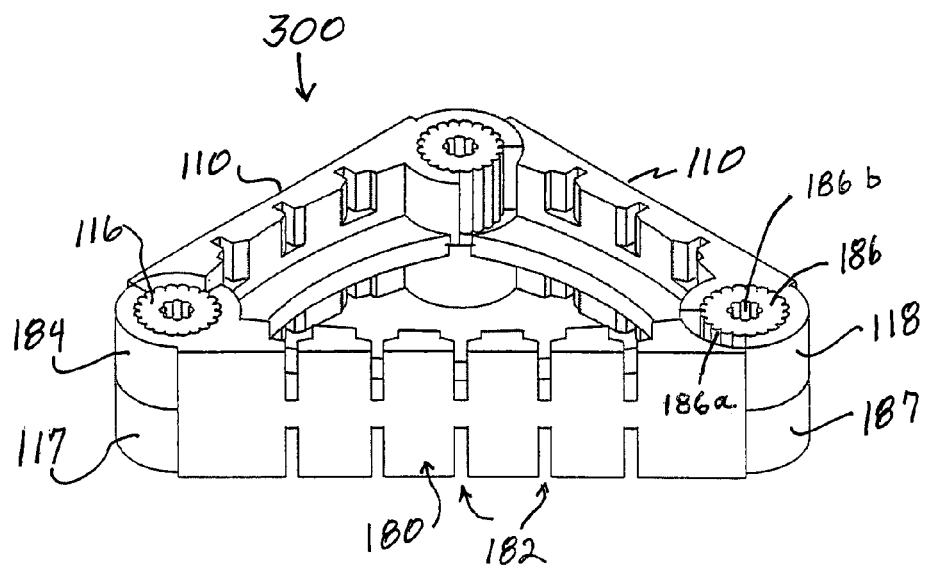
FIG. 15 is a perspective view of a 45-degree support assembly of the modular fastening system for a crown molding.

Referring now to FIGS. 14 and 15, a base unit 180 includes an arm 181 including a plurality of vertical slots 182 and a laterally extending horizontal ridge 183. Each slot 182, unlike grooves 113 of the connecting units 110, is open so as to permit the legs 192 of a crown molding attachment bracket (described below) to be laterally disposed therethrough. Each slot 182 is at least partially defined by opposite stop surfaces 182a and 182b, the function of which is described below in connection with the crown molding attachment bracket. Slots 182 are disposed both above and below the laterally extending ridge 183 and are horizontally spaced apart from each other at regular intervals. Base unit 180 further includes a first end portion 184 comprising a C-shaped member 184a having a fluted interior surface 184b. A second end portion 185 at an opposite end of the arm 181 comprises a cylindrical portion 186 having a fluted outer surface 186a and an axial bore 186b defined by an interior fluted surface. Second end portion 185 also includes a cylindrical portion 187 having an axial channel 187a defined by an interior fluted surface 187a. Cylindrical portions 186 and 187 are coaxially arranged. Cylindrical portion 186 is configured and dimensioned so as to be engaged in C-shaped end portion 118 of a connecting unit 110. Cylindrical portion 187 is configured to receive first cylindrical portion 116 of a connecting unit 110 in channel 187a. Base unit 180 is of integral single piece construction of materials described herein. The length of the base unit 180 is about 1.414 times the length of the individual connecting units 110 such that, when connected therewith to form a support assembly 300 as shown in FIG. 15, the angles at which each end of the base unit 180 is connected to a respective connecting unit 110 is 45 degrees. The angle at which the two connecting units 110 are connected to each other is 90 degrees. Thus, the support assembly 300 forms a 90-45-45 degree triangle.

Referring now to FIGS. 3 and 15 support assembly 300 is formed by connecting units 110 as shown in FIG. 3 such that angle A is 90 degrees. End portion 184 is connected to cylindrical portion 116 of one connecting unit 110 and cylindrical portion 186 of the base unit 180 is connected to the C-shaped end portion 118 of the other connecting unit 110.

Figure 16:
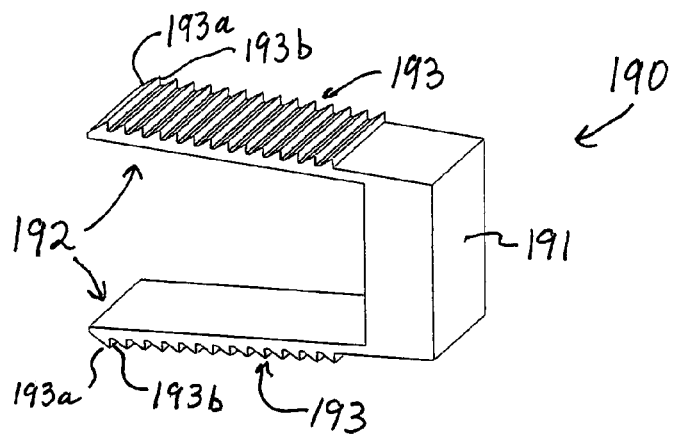
FIG. 16 is a perspective view of a crown molding attachment bracket of the modular fastening system.

Referring now to FIG. 16, a crown molding attachment bracket 190 is a generally U-shaped member of integral single piece construction of materials discussed herein. Bracket 190 includes a back portion 191 from which legs 192 extend in a spaced apart substantially parallel configuration. Legs 192 are flat members each having a planar outer surface with a plurality to saw-tooth lateral ridges 193 in a parallel array extending along the length of the legs 192. The saw-tooth ridges each include an inclined forward surface 193a and a rear surface 193b orthogonal to the outer surface of the respective leg. Crown molding attachment bracket 190 is configured to be inserted into slots 182 of the base unit 180 such that legs 192 are respectively disposed through adjacent slots 182. As can be readily appreciated, the inclined forward surfaces 193a of the sawtooth ridges 193 permit the forward insertion of legs 192 through slots 182. However, once the legs 192 are engaged in a respective slot, the legs cannot easily be withdrawn because the rear surfaces 193b will abut stop surfaces 182a and 182b of the slot. Accordingly, movement of the legs 192 through the slots 182 is permitted in only one direction, which secures the engagement of the crown molding attachment bracket 190 with the base unit 180 to prevent further relative movement between them.

Figure 17:
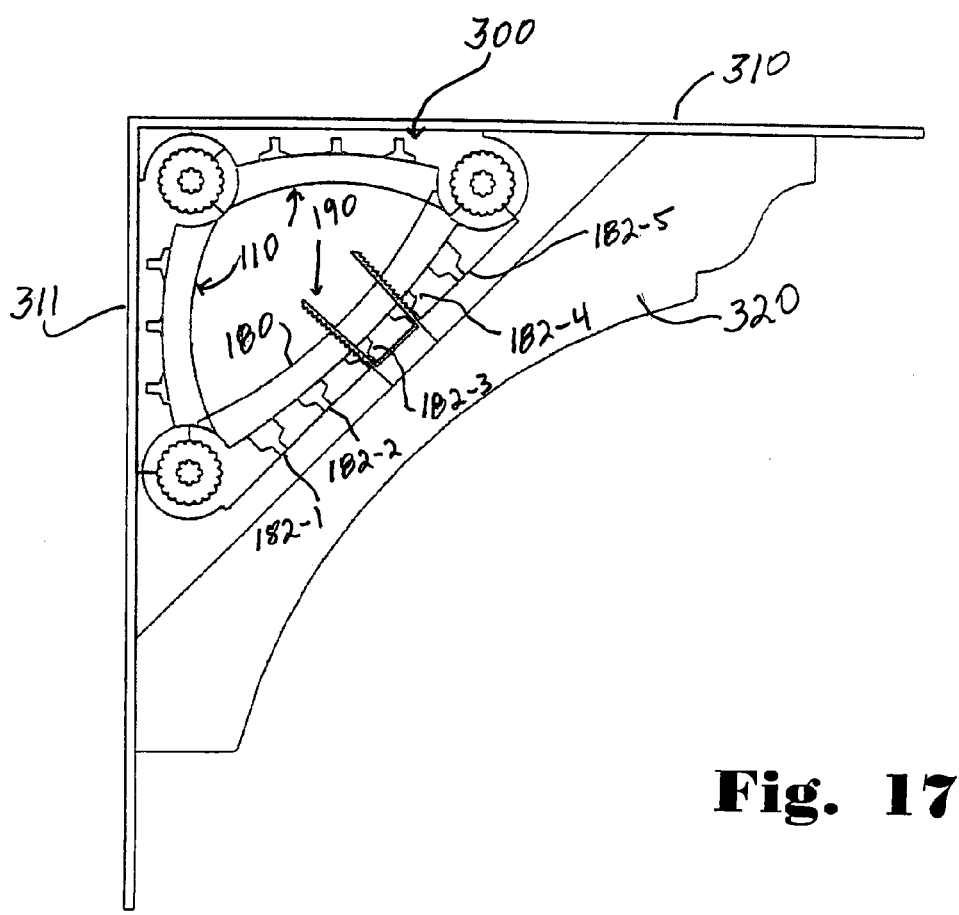
FIG. 17 is a plan view illustrating the attachment of a crown molding.

Referring now to FIG. 17, a crown molding 320 is mounted to a support assembly 300, which is mounted to the corner of a soffit 310 and a side wall 311. The crown molding 320 is fixed to the support assembly 300 by means of the crown molding attachment bracket 190, to which the crown molding is connected by means of an appropriate fastener after insertion of the bracket 190 into the base unit 180. As shown in FIG. 17, the base unit 180 possesses several slots, 182-1, 182-2, 182-3, 182-4 and 182-5. The user of the present disclosure can select which slots to be used to engage the crown molding attachment bracket 190 according to the relevant conditions. For example, as shown, the crown molding attachment bracket 190 is inserted through slots 182-3 and 182-4. However, the angle between the soffit 310 and side wall 310 might not be perfectly orthogonal. As an alternative, the crown molding attachment bracket can be inserted through slots 182-1 and 182-2, which would allow more flexibility for the combined support assembly 300 crowning molding 320 to bend or "give" in order to accommodate a minor deviation of the soffit-side wall angle from true orthogonal relationship. Furthermore, the depth of penetration of the crown molding attachment bracket 190 into the base unit 180 can be varied to accommodate minor construction variations. As stated above, the saw-tooth ridges 193 of the crown molding attachment bracket 190 prevent disengagement. Accordingly, once inserted to a certain depth, the crown molding attachment bracket 190 will stay at least at that depth.

Figure 18:
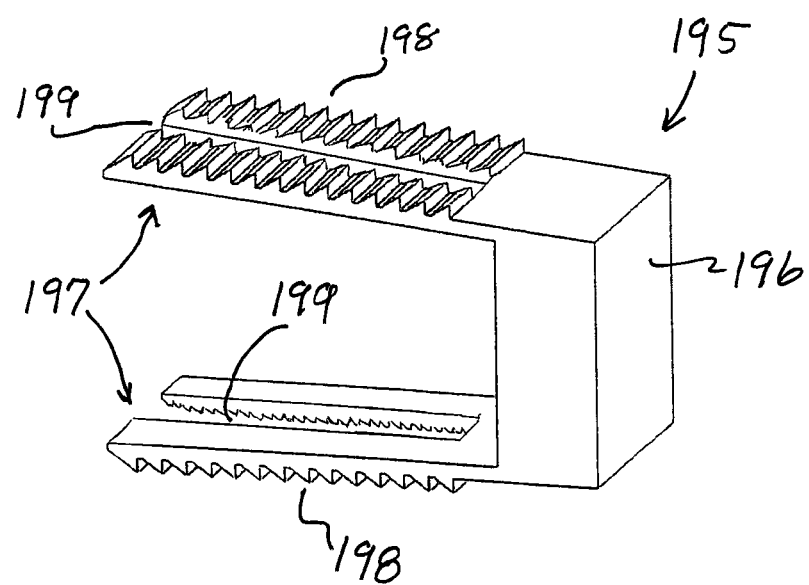
FIG. 18 is an alternative embodiment of the crown molding attachment bracket of the modular fastening system.
Figure 19:
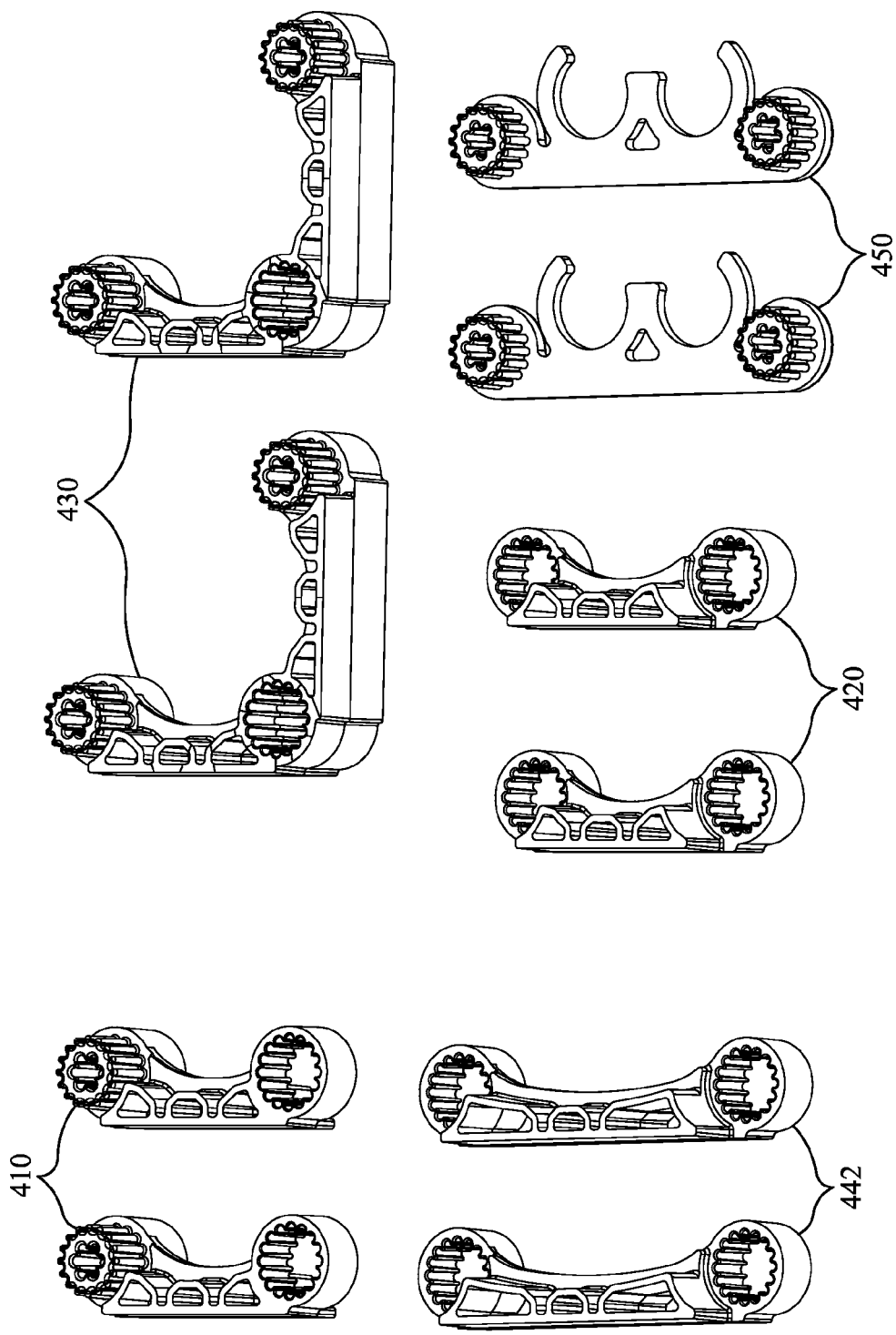
FIG. 19 is a perspective, top view of a kit in accordance with the principles of the present disclosure.

Referring to FIG. 18, an alternative embodiment 195 of the crown molding attachment bracket is shown. Embodiment 195 is similar to bracket 190 in that it includes a back portion 196, two parallel flat legs 197 so as to form a generally U-shaped configuration, and saw-tooth ridges 198 similar to ridges 193 of the crown molding attachment bracket 190. However, embodiment 195 differs in that each leg 197 includes a lengthwise slot 199. Referring briefly to FIG. 14, it can be seen that the upper slots and lower slots 182 of the base unit 180 are separated by a ridge 183. Accordingly, the crown molding attachment bracket 190 as shown in FIG. 16 can be inserted through either two adjacent upper slots or two adjacent lower slots, but not both. However, slot 199 is configured to accommodate ridge 183. Therefore, the legs 197 of crown molding attachment bracket 195 can be inserted through the vertically aligned top and bottom slots 182 of the base unit 180.

In one embodiment, shown in FIGS. 19-30, the modular fastener system is in the form of a kit 400. Kit 400 is configured to form a frame that may have a variety of shapes and sizes. The frame formed by kit 400 may be similar to frame 101 or frame 102. Kit 400 is similar to the kits described previously herein and hence may be used for any of the same purposes. Indeed, it is envisioned that kit 400 may be used to enclose a portion of a circumference of any elongated structure, without moving the elongated structure. For example, it is envisioned that kit 400 may be utilized to hide electrical wires, internet and entertainment cables, water pipes, waste lines, etc. or to create coffered ceilings and column enclosures.

Kit 400 includes at least one first connecting unit 410, at least one second connecting unit 420 and at least one third connecting unit 430. It is envisioned that kit 400 may include a plurality of first connecting units 410, a plurality of second connecting units 420 and a plurality of third connecting units 430. It is envisioned that the number of first connecting units 410, second connecting units 420 and third connecting units 430 included in kit 400 may depend upon, for example, the size and/or shape of the frame or enclosure intended to be formed with kit 400. For example, to create a large frame or enclosure, kit 400 will include more first connecting units 410, second connecting units 420 and/or third connecting units 430 than if kit 400 were intended to create a smaller frame or enclosure.

Figure 20:
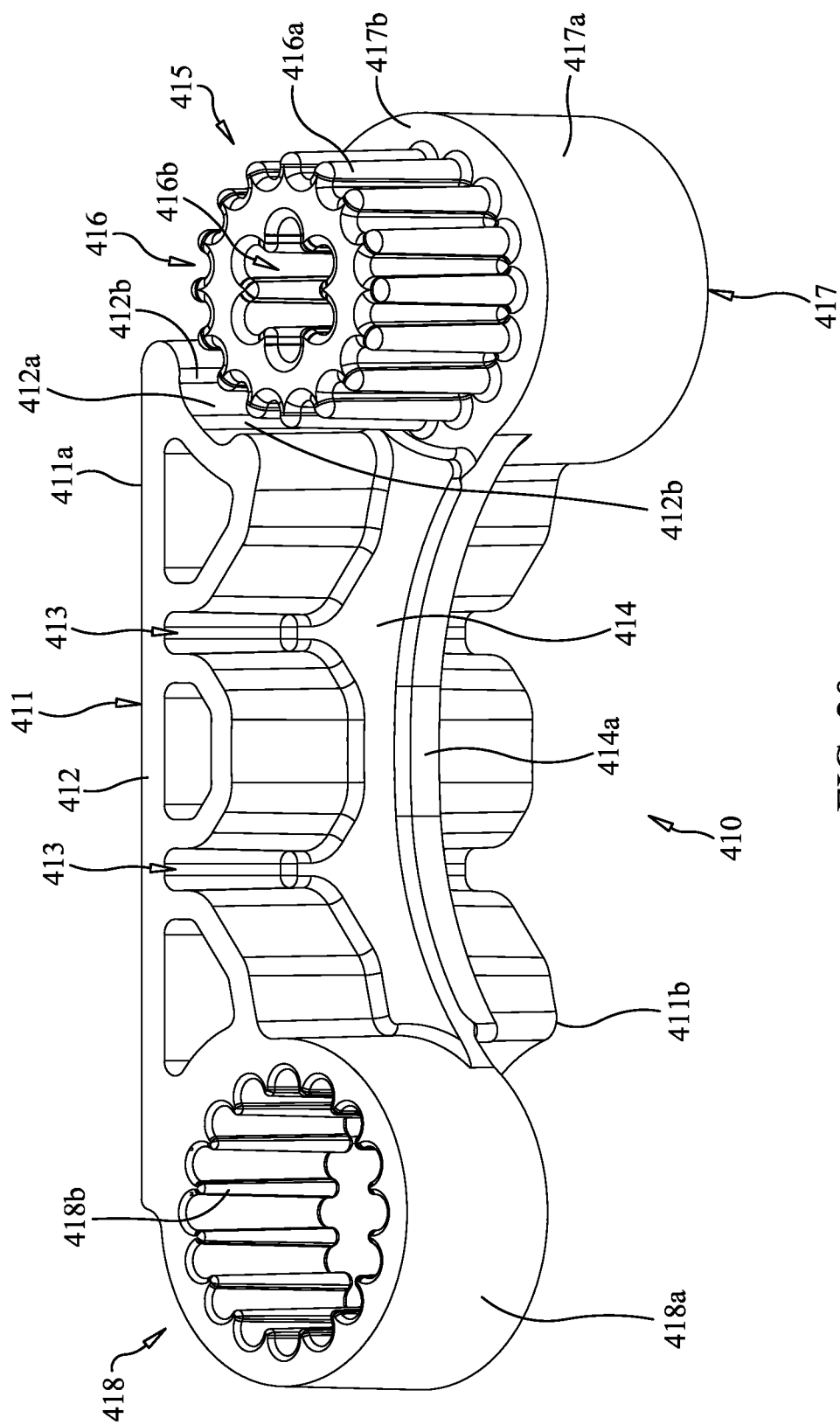
FIG. 20 is a perspective, top view a component of the kit shown in FIG. 19.
Figure 20A:
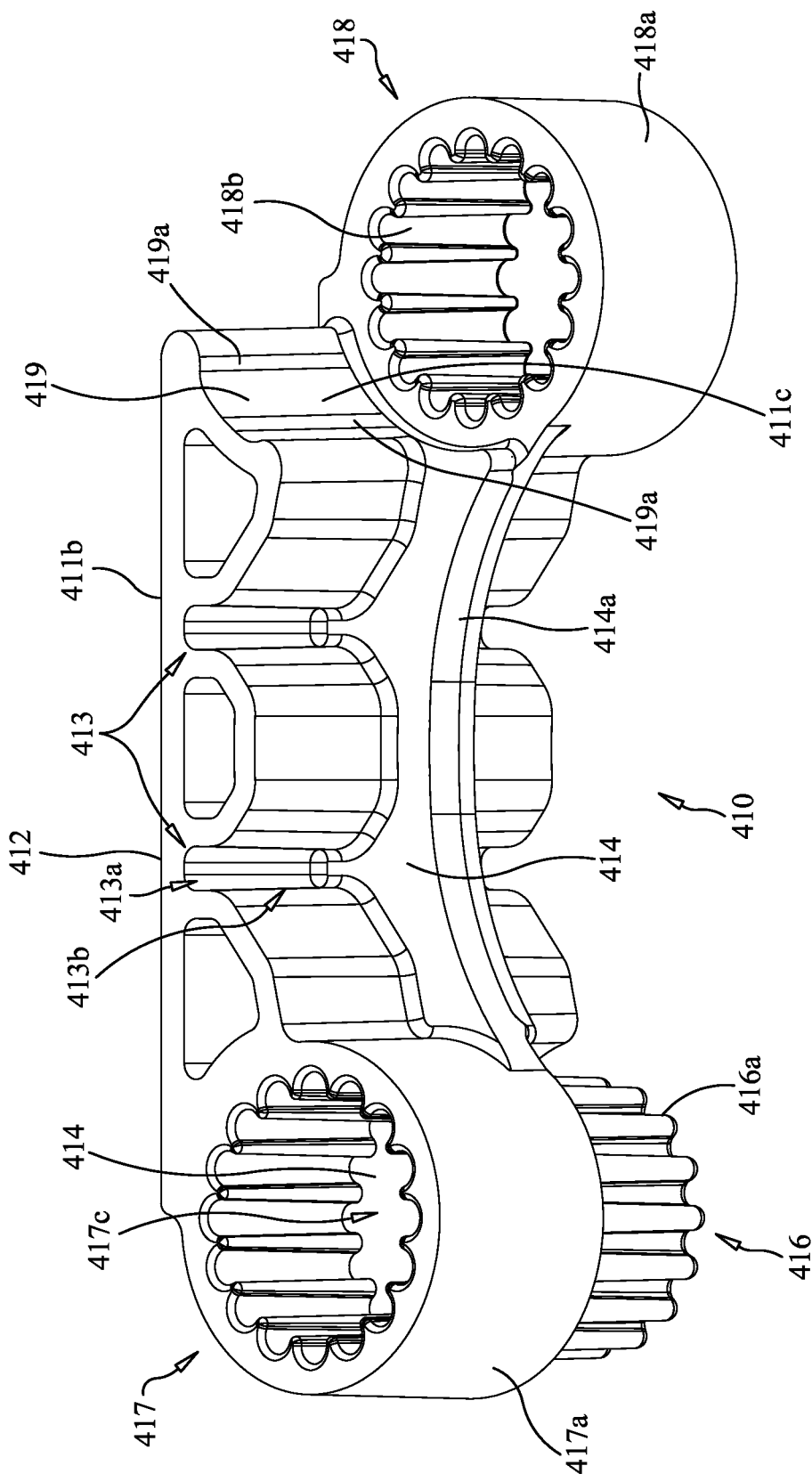
FIG. 20A is a perspective, bottom view a component of the kit shown in FIG. 19.

As shown in FIGS. 20 and 20A, first connecting units 410 are similar to connecting units 110 and 180. First connecting units 410 each include an arm 411 with opposite end portions 415 and 418. Arm 411 is an elongated portion including a back 412 optionally having a plurality of grooves 413. In some embodiments, grooves 413 may be used as screw guides to attach a frame or enclosure to a surface. In some embodiments, grooves 413 each include a first section 413a having a first width and a second section 413b having a second width that is greater than the first width, as shown in FIG. 20A. First section 413 is configured to receive a threaded shank of a screw or other fastener and second section 413b is configured to receive a head of the screw having a diameter that is greater than the first width to prevent the head form entering first section 413a.

Figure 23:
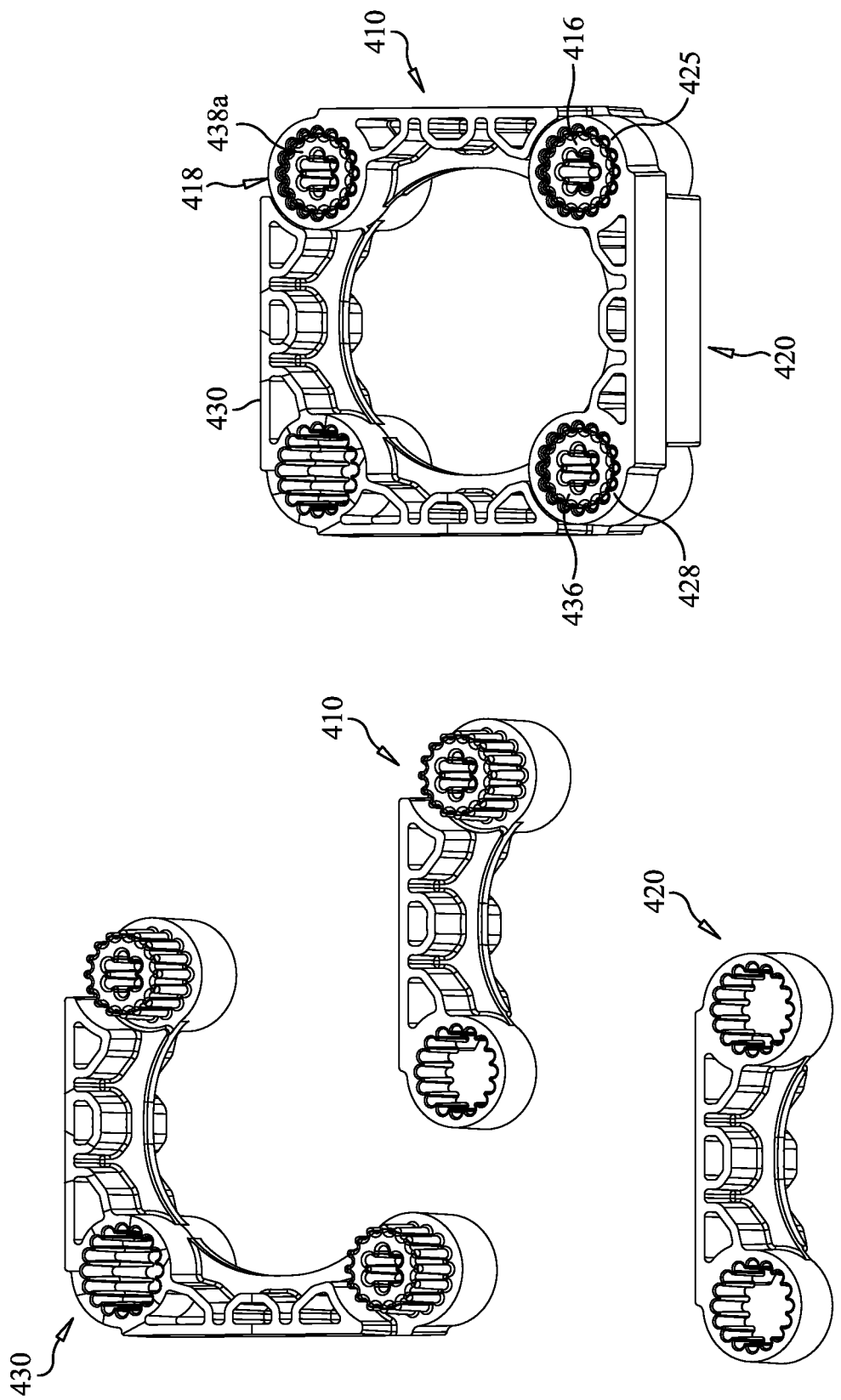
FIG. 23 shows components of the kit shown in FIG. 19 that are assembled to form a frame or enclosure.

Arm 411 includes opposite top and bottom surfaces 411a, 411b. First connecting unit 410 defines a horizontal midline positioned an equal distance from top surface 411a and bottom surface 411b. Arm 411 includes a horizontal wall, such as, for example, a ridge 414 at the horizontal midline. Horizontal wall 414 extends laterally from back 412 and has an inward facing edge 414a which can be rectilinear or curved (as shown). In some embodiments, horizontal wall 414 interrupts each of grooves 413 such that each groove 413 includes a first portion that extends through top surface 411a and terminates at horizontal wall 414 and a second portion that extends through bottom surface 411b and terminates at horizontal wall 414. In some embodiments, inward facing edge 414a is concave and/or is continuously curved between end portions 415, 418. In some embodiments, inward facing edge 414a is configured to engage an outer surface of a cylindrical structure. That is, inner edges of other first connecting units 410, one or more second connecting units 420 and one or more third connecting units 430 may form a continuous curve, as shown in FIG. 23, for example. The continuous curve created by the edges may be used to engage an outer surface of a cylindrical structure, such as, for example, a pipe or other conduit, in a manner that prevents the cylindrical structure from moving laterally within an assembled frame or enclosure. First end portion 415 includes a first cylindrical portion, such as, for example, a male connector 416. Male connector 416 has a fluted outer circumferential surface 416a possessing a plurality of vertical grooves, and an axial bore 416b defined by a fluted interior surface. First end portion 415 also includes a female portion, such as, for example, a second cylindrical portion 417 having a smooth circumferential outer surface 417a. The diameter of the second cylindrical portion 417 is greater than that of first cylindrical portion 416 so as to define an annular abutment surface 417b. Second cylindrical portion 417 further includes an axial recess 417c defined by a fluted interior surface, as shown in FIG. 20A. In some embodiments, axial recess 417c is coaxial with axial bore 416b. In some embodiments, axial recess 417c is spaced apart from axial bore 416b by horizontal wall 414 at the horizontal midline. In some embodiments, axial recess 417c is in communication with axial bore 416b such that an object can be inserted into axial bore 416b or axial recess 417c and then into the other of axial bore 416b and axial recess 417c without exiting first connecting unit 410. In some embodiments, first cylindrical portion 416 extends from the horizontal midline to top surface 411a and second cylindrical portion 417 extends from the midline to bottom surface 411b.

In some embodiments, arm 411 includes vertical wall 412a adjacent end portion 415, as shown in FIG. 20. Vertical wall 412 is spaced apart from end portion 415 by a gap. Vertical wall 412a is concavely curved and includes one or a plurality of vertically extending protrusions 412b configured to create a tighter fit between male and female connectors. In some embodiments, protrusions 412b each extend parallel to the flutes of fluted outer surface 416a. In some embodiments, protrusions 412b may be disposed at alternate orientations, relative to the flutes of fluted outer surface 416a, such as, for example, transverse, perpendicular and/or other angular orientations such as acute or obtuse, co-axial and/or may be offset or staggered.

Second end portion 418 is a female connector having a smooth outer surface 418a and a fluted interior surface 418b. Female connector 418 extends outwardly from a vertical wall 411c of arm 411 in a cantilevered configuration, as shown in FIG. 20A. Female connector 418 extends from the horizontal midline of the connecting unit 410 to top surface 411a. That is, a top surface of female connector 418 is flush or continuous with top surface 411a such that the top surface of female connector 418 lies in the same plane as top surface 411a. In some embodiments, top surface 411a forms the top surface of female connector 418. In some embodiments, a bottom surface of horizontal wall 414 is flush or continuous with a bottom surface of female connector 418 such that the bottom surface of horizontal wall 414 lies in the same plane as the bottom surface of female connector 418. In some embodiments, the bottom surface of horizontal wall 414 forms the bottom surface of female connector 418.

In some embodiments, vertical wall 411c has a curved end surface 419 in the vicinity of the second end portion 418. In some embodiments, curved end surface 419 includes one or a plurality of vertically extending protrusions 419a configured to create a tighter fit between male and female connectors. In some embodiments, protrusions 419a each extend parallel to the flutes of fluted outer surface 416a and/or the flutes of fluted interior surface 418b. In some embodiments, protrusions 419a may be disposed at alternate orientations, relative to the flutes of fluted outer surface 416a and/or the flutes of fluted interior surface 418b, such as, for example, transverse, perpendicular and/or other angular orientations such as acute or obtuse, co-axial and/or may be offset or staggered.

Figure 20B:
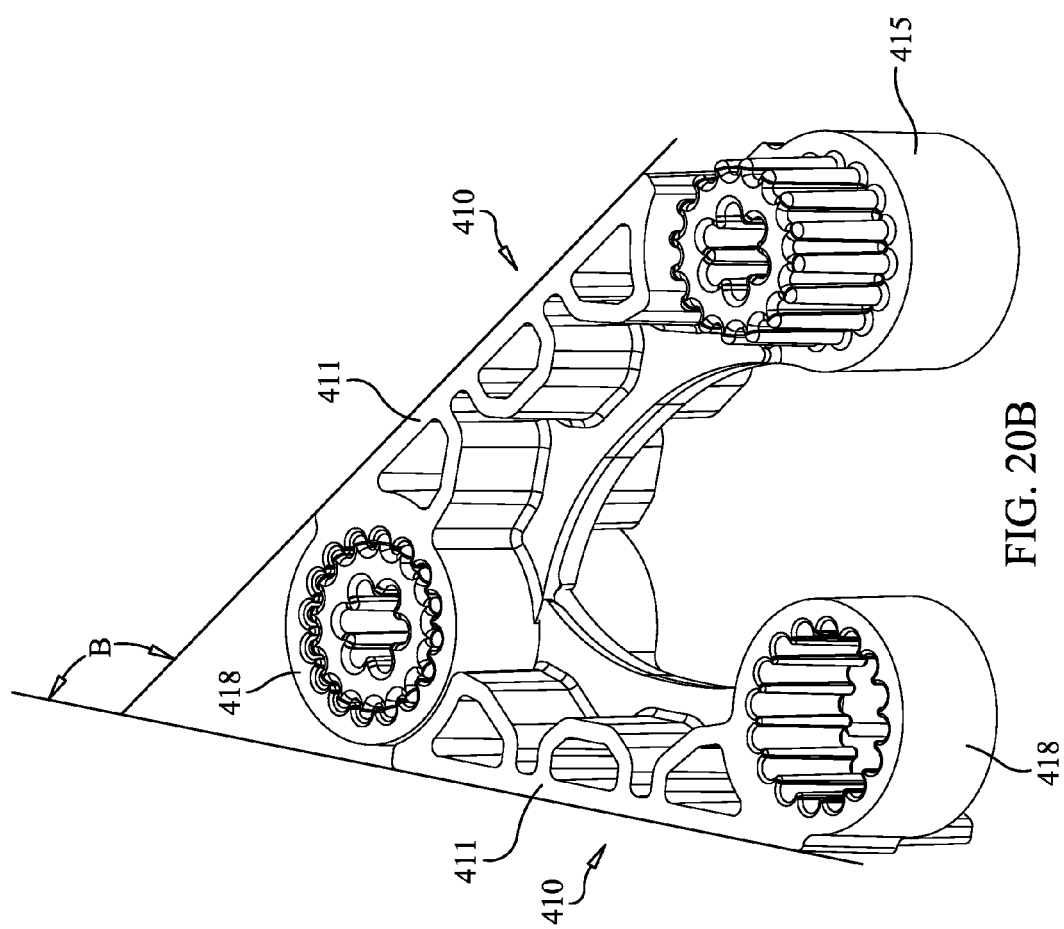
FIG. 20B is a perspective, top view of components of the kit shown in FIG. 19.

Connecting units 410 can be assembled by inserting male connector 416 of a first connecting unit 410 into female connector 418 of a second connecting unit 410 such that fluted outer surfaces 416a of the first connecting unit 410 mate with the fluted interior surface 418b of the second connecting unit 410, as shown in FIG. 20B. That is, the flutes of fluted outer surfaces 416a of the first connecting unit 410 are positioned between the flutes of the fluted interior surface 418b of the second connecting unit 410 to couple the first connecting unit 410 to the second connecting unit 410 in a manner that prevents rotation of the first connecting unit 410 relative to the second connecting unit 410. At least a portion of end portion 418 is positioned within the gap between vertical wall 412 and male connector 416. A planar bottom surface of end portion 418 engages abutments surface 417b.

When male connector 416 of the first connecting unit 410 is inserted into female connector 418 of a second connecting unit 410, female connector 418 encloses at least a portion of male connector 416 such that male connector 416 cannot be removed from female connector 418 by moving the first connecting unit 410 laterally relative to the second connecting unit 410. Rather, the first connecting unit 410 must be moved vertically relative to the second connecting unit 410 to remove male connector 416 from female connector 418. In some embodiments, the fluted surfaces contain a plurality of vertical grooves or flutes. The flutes define ridges between adjacent flutes. This configuration allows the orientation of the two connecting units to be selected during the assembly process so that the arms 411 can be configured in a variety of different angular relationships. As shown, angle B defined by the two arms 411 can be almost any degrees with the only limitation on the gearing of the fluted surfaces. That is, the fluted surfaces can be designed so that moving the connecting portion from one fluted surface to an adjacent fluted surface creates a new structure having a defined change in degrees. The more ridges in the fluted inner and/or outer surfaces, the greater the number of different degrees that can be created. For example, if the fluted surfaces of the inner and/or outer surfaces has only four ridges located at 90 degrees apart, the connectors that connect to the fluted piece would be able to be form angles of 90, 180, and 270 degrees between components. Doubling the number of ridges would double the number of angles that can be achieved. Increasing the number of ridges on the connector directly increases the number of possible angles that can be achieved by the fastening component system. In some embodiments, angle B is between about 0 degrees and about 145 degrees. In some embodiments, angle B is between 0 degrees and 145 degrees.

Figure 21:
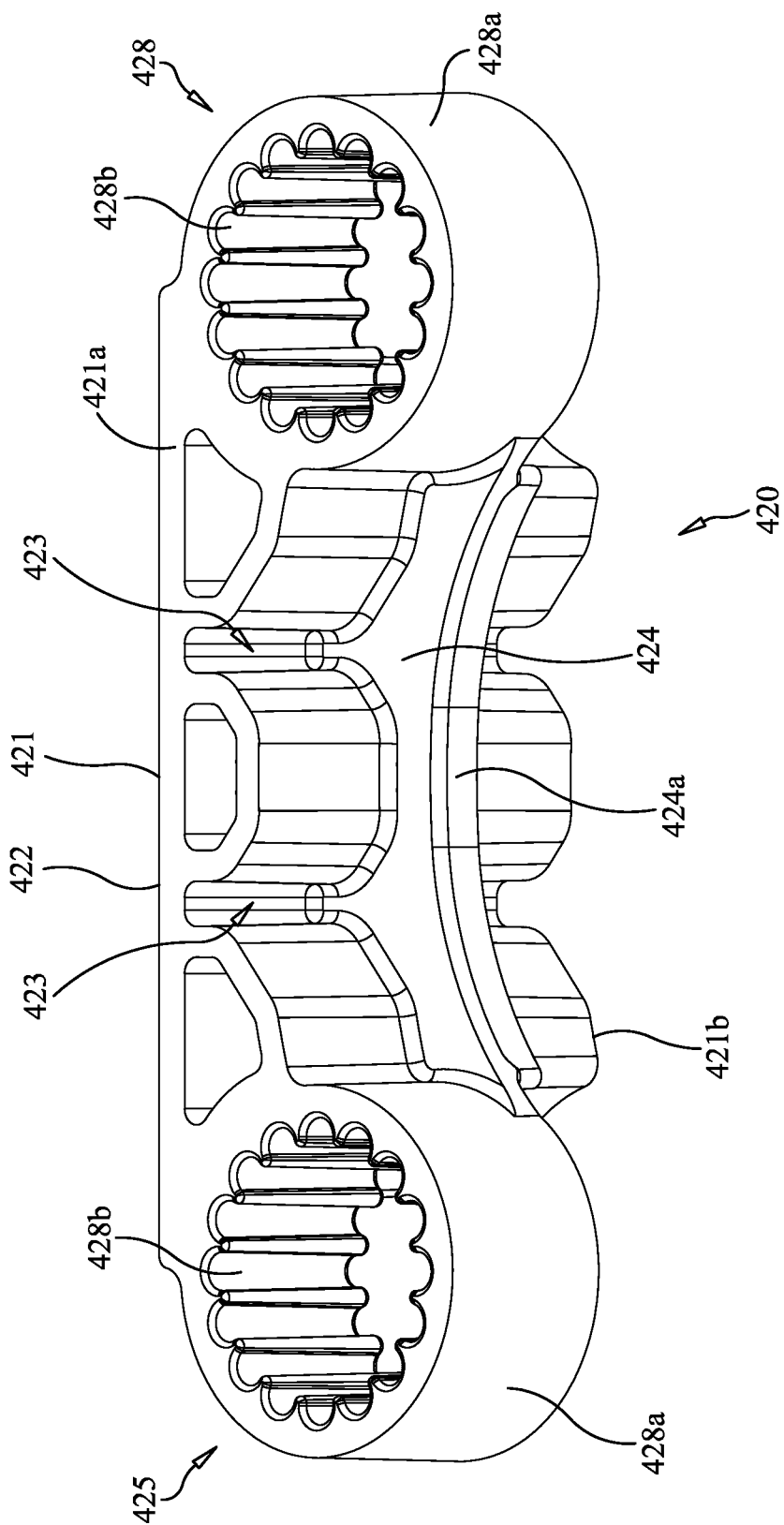
FIG. 21 is a perspective, top view a component of the kit shown in FIG. 19.
Figure 21A:
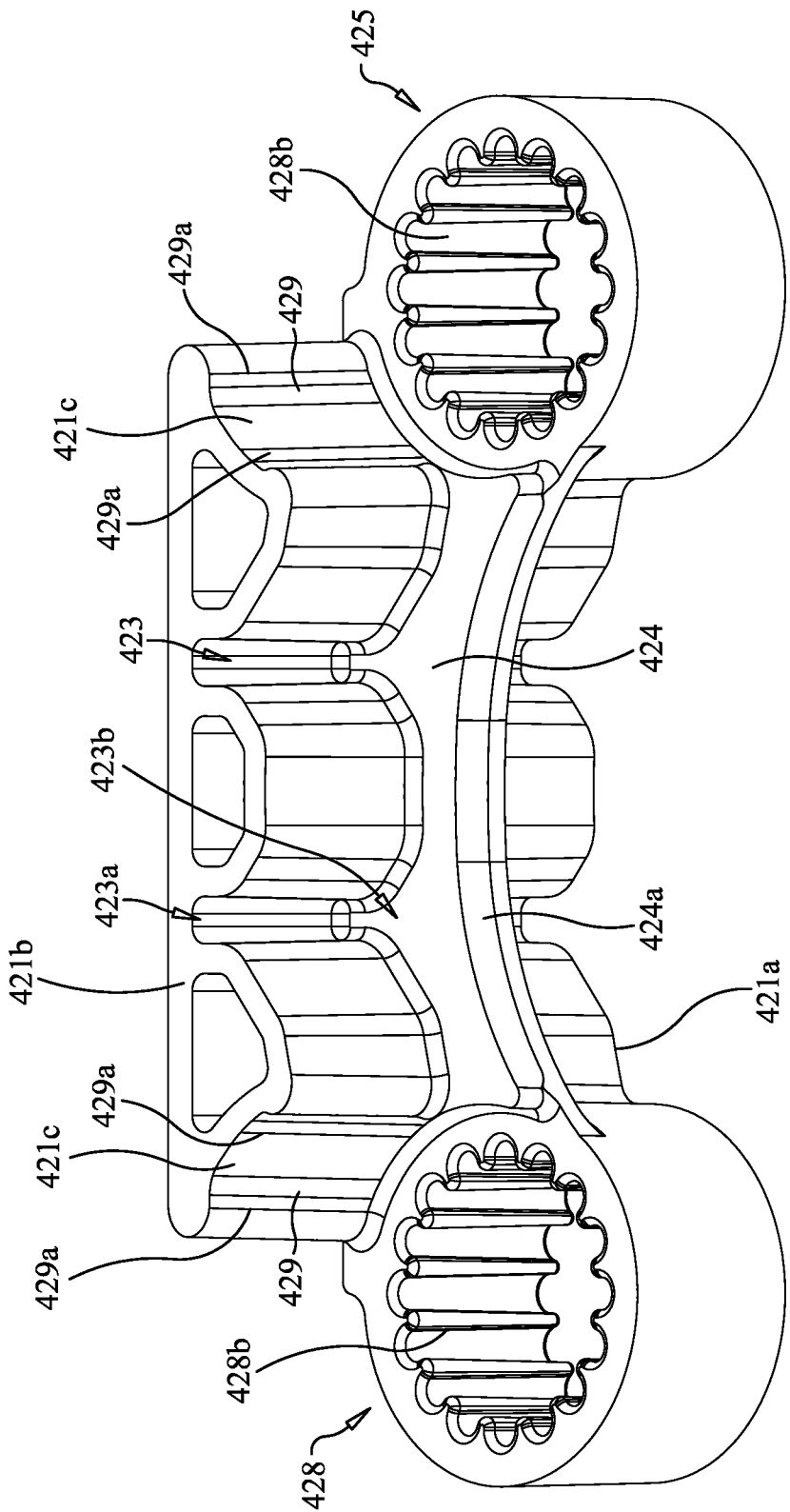
FIG. 21A is a perspective, bottom view a component of the kit shown in FIG. 19.

As shown in FIGS. 21 and 21A, second connecting units 420 each include an arm 421 with opposite end portions 425 and 428. Arm 421 is an elongated portion including a back 422 optionally having a plurality of grooves 423. In some embodiments, grooves 423 may be used as screw guides to attach a frame or enclosure to a surface. In some embodiments, grooves 423 each include a first section 423a having a first width and a second section 423b having a second width that is greater than the first width, as shown in FIG. 21A. First section 423 is configured to receive a threaded shank of a screw or other fastener and second section 423b is configured to receive a head of the screw having a diameter that is greater than the first width to prevent the head form entering first section 423a.

Arm 421 includes opposite top and bottom surfaces 421a, 421b. Second connecting unit 420 defines a horizontal midline positioned an equal distance from top surface 421a and bottom surface 421b. Arm 421 includes a horizontal wall, such as, for example, a ridge 424 at the horizontal midline. Horizontal wall 424 extends laterally from back 422 and has an inward facing edge 424a which can be rectilinear or curved (as shown). In some embodiments, inward facing edge 424a is concave and/or is continuously curved between end portions 425, 428. In some embodiments, inward facing edge 424a is configured to engage an outer surface of a cylindrical structure. As discussed above, inner edges of other first connecting units 410, one or more second connecting units 420 and/or one or more third connecting units 430 may form a continuous curve, as shown in FIG. 23 for example. The continuous curve created by the edges may be used to engage an outer surface of a cylindrical structure, such as, for example a pipe or other conduit, in a manner that prevents the cylindrical structure from moving laterally within an assembled frame or enclosure. In some embodiments, horizontal wall 424 interrupts each of grooves 423 such that each groove 423 includes a first portion that extends through top surface 421a and terminates at horizontal wall 424 and a second portion that extends through bottom surface 421b and terminates at horizontal wall 424.

First and second end portions 425, 428 are each female connectors having a smooth outer surface 428a and a fluted interior surface 418b. Female connectors 428 each extends outwardly from a vertical wall 411c of arm 411 in a cantilevered configuration, as shown in FIG. 21A. Female connectors 418 each extend from the horizontal midline of connecting unit 420 to top surface 421a. That is, a top surface of each female connector 428 is flush or continuous with top surface 421a such that the top surface of each female connector 428 lies in the same plane as top surface 421a. In some embodiments, top surface 421a forms the top surface of each female connector 428. In some embodiments, a bottom surface of horizontal wall 424 is flush or continuous with a bottom surface of each female connector 428 such that the bottom surface of horizontal wall 424 lies in the same plane as the bottom surface of each female connector 428. In some embodiments, the bottom surface of horizontal wall 424 forms the bottom surface of each female connector 428. In some embodiments, vertical walls 421c each have a curved end surface 429. In some embodiments, curved end surfaces 419 each include one or a plurality of vertically extending protrusions 429a that are similar to protrusions 412b and protrusions 419a of first connecting unit 410 in both structure and function. In some embodiments, protrusions 429a each extend parallel to the flutes of fluted interior surfaces 428b. In some embodiments, protrusions 429a may be disposed at alternate orientations, relative to the flutes of fluted interior surfaces 428b, such as, for example, transverse, perpendicular and/or other angular orientations such as acute or obtuse, co-axial and/or may be offset or staggered.

Connecting units 410 can each be coupled to connecting units 420 by inserting male connector 416 of a connecting unit 410 into female connector 428 of a connecting unit 420 such that fluted outer surfaces 416a of connecting unit 410 mate with the fluted interior surface 428b of connecting unit 420, as shown in FIG. 21B. That is, the flutes of fluted outer surface 416a of connecting unit 410 are positioned between the flutes of the fluted interior surface 428b of connecting unit 420 to couple connecting unit 410 to connecting unit 420 in a manner that prevents rotation of connecting unit 410 relative to connecting unit 420. At least a portion of one of end portions 428 is positioned within the gap between vertical wall 412 and male connector 416. A planar bottom surface of one of end portions 428 engages abutments surface 417b.

When male connector 416 of connecting unit 410 is inserted into female connector 428 of connecting unit 420, female connector 428 encloses at least a portion of male connector 426 such that male connector 416 cannot be removed from female connector 428 by moving connecting unit 410 laterally relative to connecting unit 420. Rather, connecting unit 420 must be moved vertically relative to connecting unit 420 to remove male connector 416 from female connector 428. In some embodiments, fluted inner surfaces 482b each include a plurality of vertical grooves or flutes. The flutes define ridges between adjacent flutes. This configuration allows the orientation of connecting units 410 and 420 to be selected during the assembly process so that the arm 411 can be configured in a variety of different angular relationships relative to arm 421. As shown, angle C defined by the arms 411 and arm 421 can be almost any degrees with the only limitation on the gearing of the fluted surfaces. The more ridges in inner surfaces 482b and/or fluted outer surfaces 416a, the greater to number of different degrees that can be created. In some embodiments, angle C is between about 0 degrees and about 145 degrees. In some embodiments, angle C is between 0 degrees and 145 degrees.

Figure 22:
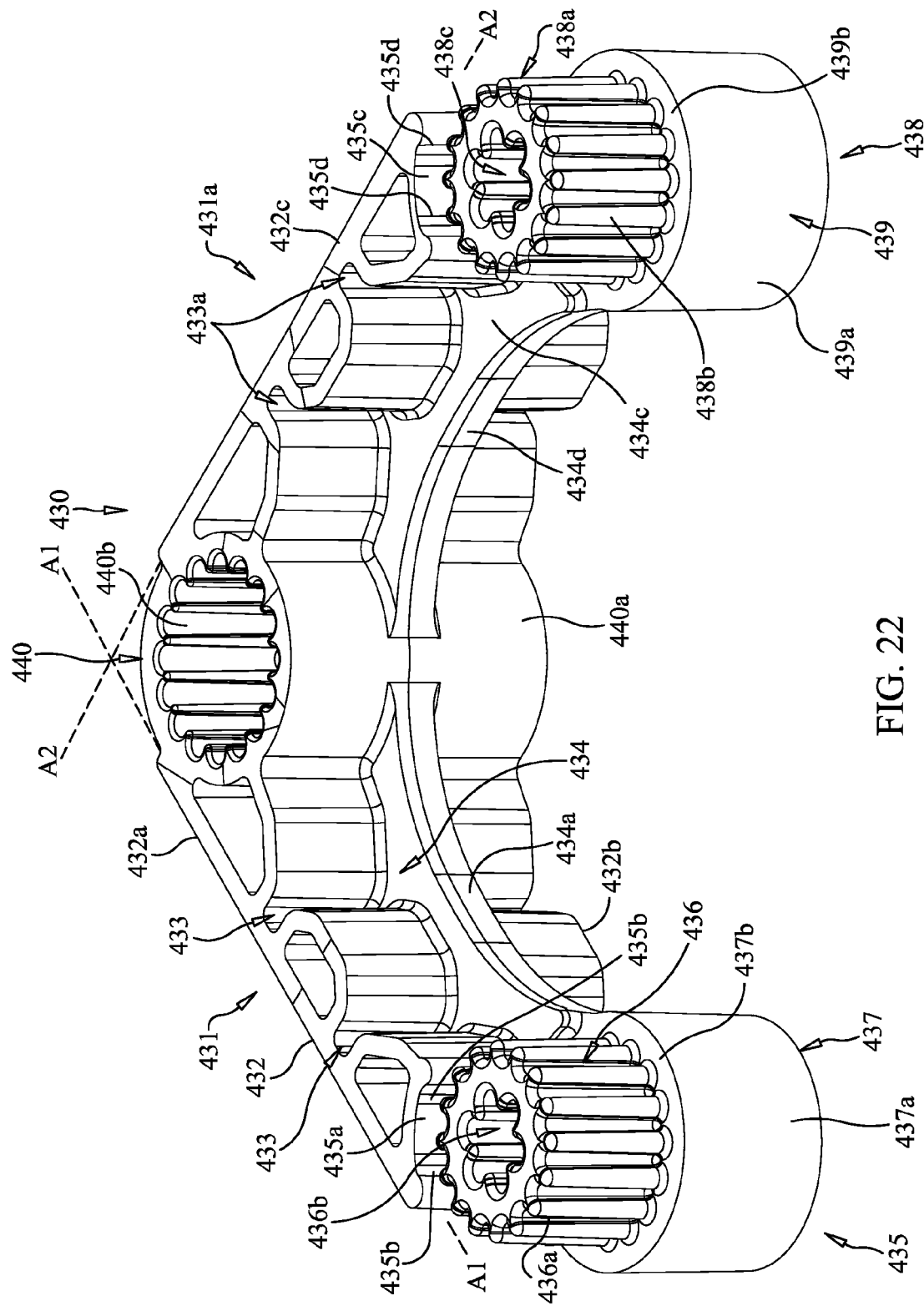
FIG. 22 is a perspective, top view a component of the kit shown in FIG. 19.
Figure 22A:
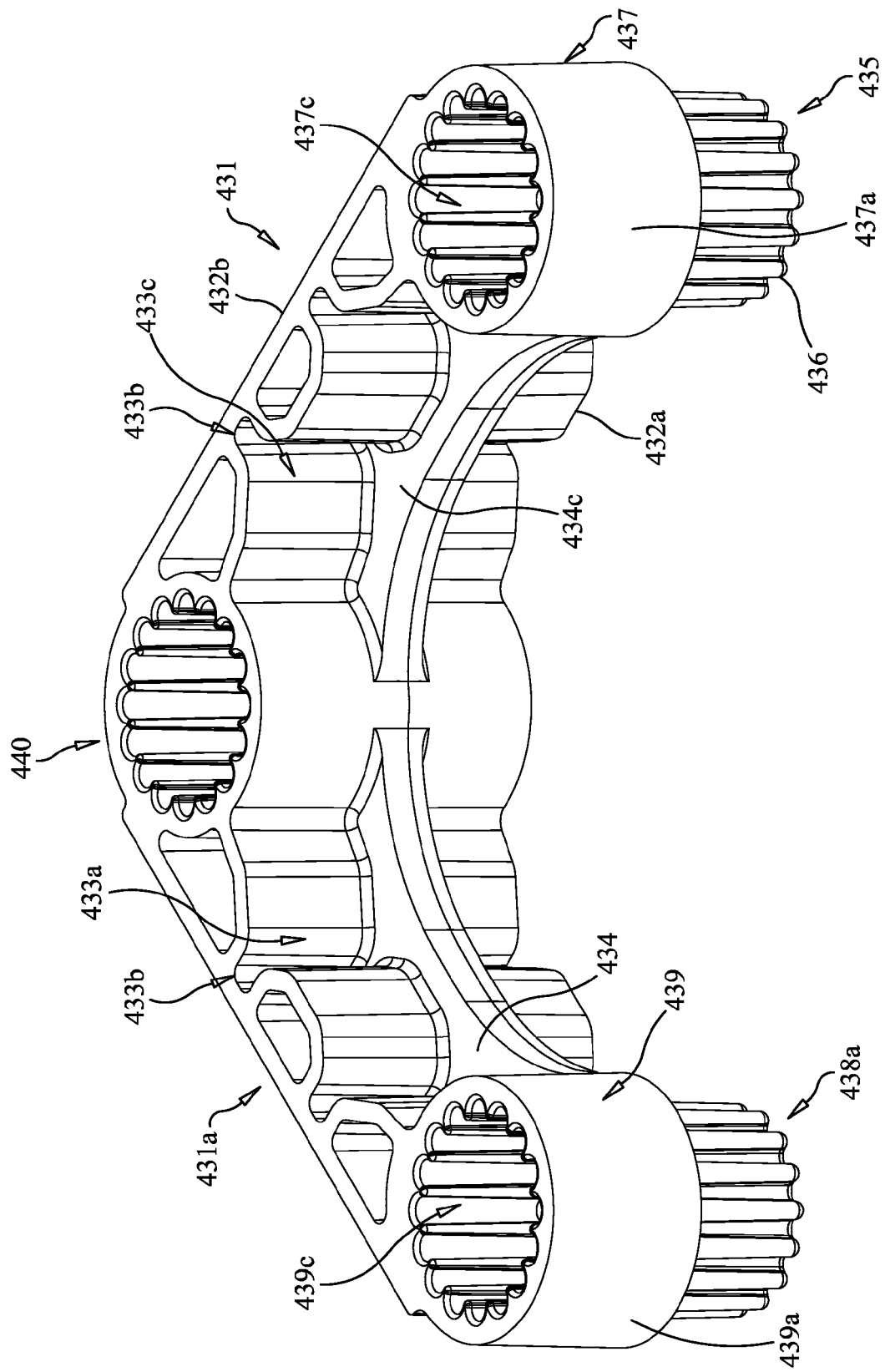
FIG. 22A is a perspective, bottom view a component of the kit shown in FIG. 19.

As shown in FIGS. 22 and 22A, third connecting units 430 each include a first end having an arm 431 that includes an end portion 415 and a second end having an arm 431a that includes an end portion 438. Arm 431 extends along a first axis A1 and arm 431a extends along a second axis A2. First axis A1 extends transverse to second axis A2. In some embodiments, first axis A1 extends perpendicular to second axis A2. In some embodiments, arm 431 may be disposed at alternate orientations, relative to arm 431a, such as, for example, transverse, perpendicular and/or other angular orientations such as acute or obtuse, co-axial and/or may be offset or staggered.

Arm 431 is an elongated portion including a back 432 optionally having a plurality of grooves 433. In some embodiments, grooves 433 may be used as screw guides to attach a frame or enclosure to a surface. In some embodiments, grooves 433 each include a first section 433b having a first width and a second section 433c having a second width that is greater than the first width, as shown in FIG. 22A. First section 433b is configured to receive a threaded shank of a screw or other fastener and second section 433c is configured to receive a head of the screw having a diameter that is greater than the first width to prevent the head form entering first section 433b.

Arm 431 includes opposite top and bottom surfaces 432a, 432b. Third connecting unit 430 defines a horizontal midline positioned an equal distance from top surface 432a and bottom surface 432b. Arm 431 includes a horizontal wall, such as, for example, a ridge 434 at the horizontal midline. Horizontal wall 434 extends laterally from back 432 and has an inward facing edge 434a which can be rectilinear or curved (as shown). In some embodiments, inward facing edge 434a is concave and/or is continuously curved. In some embodiments, inward facing edge 434a is configured to engage an outer surface of a cylindrical structure. As discussed above, inner edges of other first connecting units 410, one or more second connecting units 420 and one or more third connecting units 430 may form a continuous curve, as shown in FIG. 23 for example. The continuous curve created by the edges may be used to engage an outer surface of a cylindrical structure, such as, for example a pipe or other conduit, in a manner that prevents the cylindrical structure from moving laterally within an assembled frame or enclosure. In some embodiments, horizontal wall 434 interrupts each of grooves 433 such that each groove 433 includes a first portion that extends through top surface 432a and terminates at horizontal wall 434 and a second portion that extends through bottom surface 432b and terminates at horizontal wall 434. First end portion 435 includes a first cylindrical portion, such as, for example, a male connector 436. Male connector 436 has a fluted outer circumferential surface 436a possessing a plurality of vertical grooves, and an axial bore 436b defined by a fluted interior surface. First end portion 435 also includes a female portion, such as, for example, a second cylindrical portion 437 having a smooth circumferential outer surface 437a. The diameter of the second cylindrical portion 437 is greater than that of first cylindrical portion 436 so as to define an annular abutment surface 437b. Second cylindrical portion 437 further includes an axial recess 437c defined by a fluted interior surface, shown in FIG. 22A. In some embodiments, axial recess 437c is coaxial with axial bore 436b. In some embodiments, axial recess 437c is spaced apart from axial bore 436b by horizontal wall 434 at the horizontal midline. In some embodiments, axial recess 437c is in communication with axial bore 436b such that an object can be inserted into axial bore 436b or axial recess 437c and then into the other of axial bore 436b and axial recess 437c without exiting third connecting unit 430. In some embodiments, first cylindrical portion 436 extends from the horizontal midline to top surface 431a and second cylindrical portion 437 extends from the midline to bottom surface 431b.

In some embodiments, arm 431 includes a vertical wall 435a adjacent end portion 435, as shown in FIG. 22. Vertical wall 435a is spaced apart from male connector 436 by a gap.

Vertical wall 435a is concavely curved and includes one or a plurality of vertically extending protrusions 435b. Protrusions 435b are similar in both structure and function to protrusions 412b and protrusions 419a discussed above. In some embodiments, protrusions 435b each extend parallel to the flutes of fluted outer surface 436a. In some embodiments, protrusions 435b may be disposed at alternate orientations, relative to the flutes of fluted outer surface 436a, such as, for example, transverse, perpendicular and/or other angular orientations such as acute or obtuse, co-axial and/or may be offset or staggered.

Arm 431a is an elongated portion including a back 432c optionally having a plurality of grooves 433a. In some embodiments, grooves 433a may be used as screw guides to attach a frame or enclosure to a surface. In some embodiments, grooves 433a each include a first section 433b having a first width and a second section 433c having a second width that is greater than the first width, as shown in FIG. 22A. First section 433b is configured to receive a threaded shank of a screw or other fastener and second section 433c is configured to receive a head of the screw having a diameter that is greater than the first width to prevent the head form entering first section 433b.

Arm 431 includes opposite top and bottom surfaces 432a, 432b. Arm 431a includes a horizontal wall, such as, for example, a ridge 434c at the horizontal midline. Horizontal wall 434c extends laterally from back 432c and has an inward facing edge 434d which can be rectilinear or curved (as shown). In some embodiments, inward facing edge 434d is concave and/or is continuously curved. In some embodiments, horizontal wall 434c interrupts each of grooves 433a such that each groove 433a includes a first portion that extends through top surface 432a and terminates at horizontal wall 434c and a second portion that extends through bottom surface 432b and terminates at horizontal wall 434c. Second end portion 438 includes a first cylindrical portion, such as, for example, a male connector 438a. Male connector 438s has a fluted outer circumferential surface 438b possessing a plurality of vertical grooves, and an axial bore 438c defined by a fluted interior surface. Second end portion 438 also includes a female portion, such as, for example, a second cylindrical portion 439 having a smooth circumferential outer surface 439a. The diameter of the second cylindrical portion 439 is greater than that of first cylindrical portion 438a so as to define an annular abutment surface 439b. Second cylindrical portion 439 further includes an axial recess 439c defined by a fluted interior surface, shown in FIG. 22A. In some embodiments, axial recess 439c is coaxial with axial bore 438c. In some embodiments, axial recess 437c is spaced apart from axial bore 438c by horizontal wall 434c at the horizontal midline. In some embodiments, axial recess 439c is in communication with axial bore 438c such that an object can be inserted into axial bore 438c or axial recess 439c and then into the other of axial bore 438c and axial recess 439c without exiting third connecting unit 430. In some embodiments, male connector 438a extends from the horizontal midline to top surface 431a and second cylindrical portion 437 extends from the midline to bottom surface 431b.

In some embodiments, arm 431a includes vertical wall 435c adjacent end portion 435, as shown in FIG. 22. Vertical wall 435c is spaced apart from male connector 438a by a gap. Vertical wall 435c is concavely curved and includes one or a plurality of vertically extending protrusions 435d. Protrusions 435d are similar in both structure and function to protrusions 412b and protrusions 419a discussed above. In some embodiments, protrusions 435d each extend parallel to the flutes of fluted outer surface 438b. In some embodiments, protrusions 435d may be disposed at alternate orientations, relative to the flutes of fluted outer surface 438b, such as, for example, transverse, perpendicular and/or other angular orientations such as acute or obtuse, co-axial and/or may be offset or staggered.

Arms 431, 431a converge at an intermediate portion 440 of third connecting unit 430. Intermediate portion 440 includes a female connector 440a defined by an interior fluted surface 440b. Interior fluted surface 440b extends continuously between top and bottom surfaces 432a, 432b. A top surface of female connector 440a is flush or continuous with top surface 432a such that the top surface of female connector 440a lies in the same plane as top surface 432a. In some embodiments, top surface 432a forms the top surface of female connector 440a. In some embodiments, a bottom surface of female connector 440a is flush or continuous with bottom surface 432b such that the bottom surface of female connector 440a lies in the same plane as bottom surface 432b. In some embodiments, bottom surface 432b forms the bottom surface of female connector 440a. Female connector 440a opens through top and bottom surfaces 432a, 432b such that a male connector, such as, for example, male connector 436 or male connector 438a of another third connecting unit or male connector 416 of a first connecting unit 410 can be positioned in female connector 440a to couple another third connecting unit 430 and/or a first connecting unit 410 to the third connecting unit 430. This configuration allows a male connector 438a of another third connecting unit or male connector 416 of a first connecting unit 410 to be inserted into female connector 440a through the opening that extends through top surface 432a or the opening that extends through bottom surface 432b.

Figure 22B:
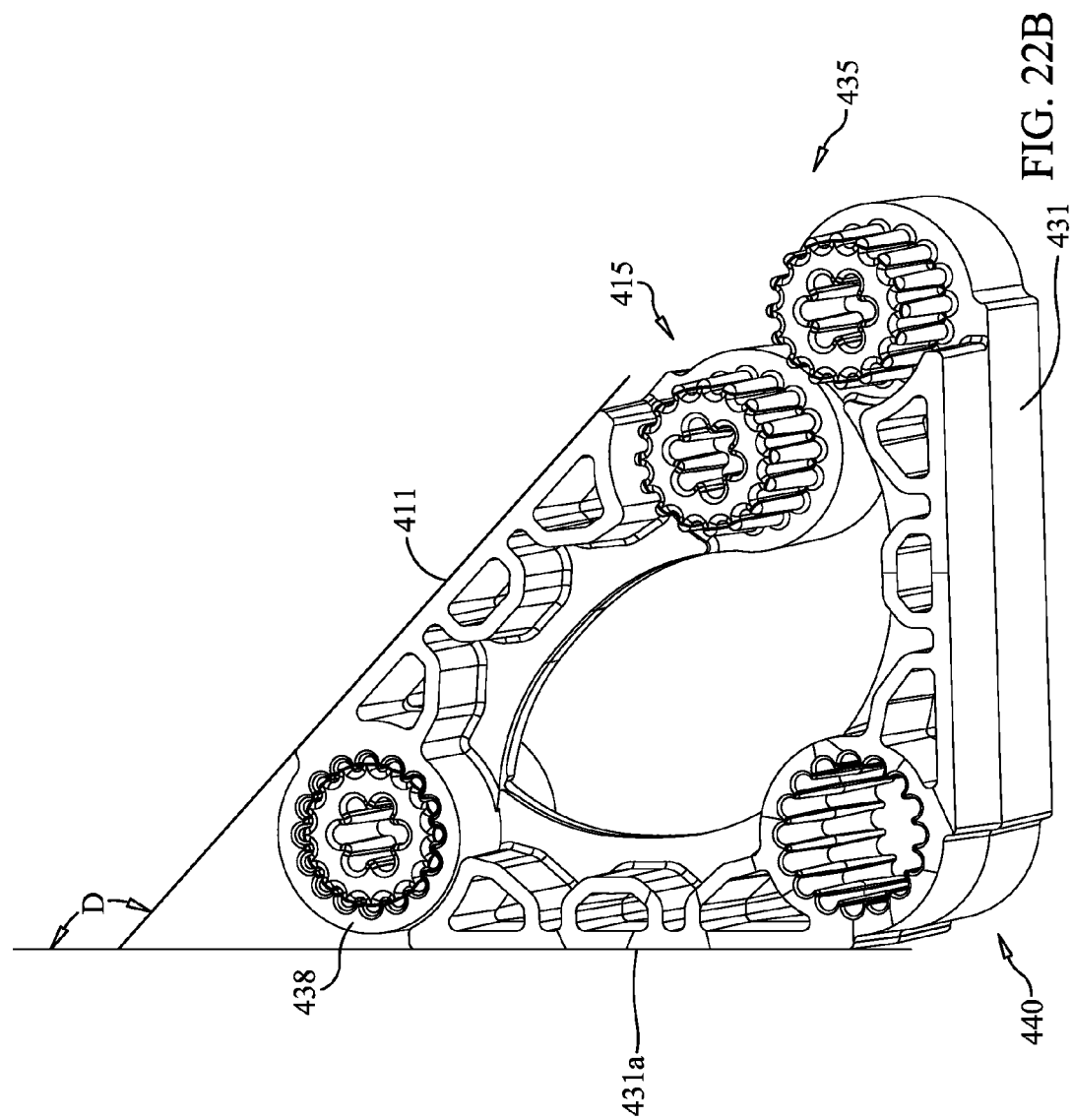
FIG. 22B is a perspective, top view of components of the kit shown in FIG. 19.

Connecting units 430 can be coupled to connecting units 410 by inserting one of male connectors 436, 438a of a connecting unit 430 into female connector 417 of a connecting unit 410 such that fluted outer surface 436a or fluted outer surface 438b of connecting unit 430 mate with the fluted interior surface 418b of connecting unit 410, as shown in FIG. 22B. That is, the flutes of fluted outer surface 436a or fluted outer surface 438b of connecting unit 430 are positioned between the flutes of the fluted interior surface 418b of connecting unit 410 to couple connecting unit 430 to connecting unit 410 in a manner that prevents rotation of connecting unit 410 relative to connecting unit 430. At least a portion of end portions 418 is positioned within the gap between vertical wall 435c and male connector 438a. A planar bottom surface of end portion 418 engages abutments surface 439b.

When male connector 436 or male connector 438a of connecting unit 430 is inserted into female connector 417 of connecting unit 410, female connector 418 encloses at least a portion of male connector 436 or male connector 438a such that male connector 436 or male connector 438a cannot be removed from female connector 417 by moving connecting unit 410 laterally relative to connecting unit 430. Rather, connecting unit 410 must be moved vertically relative to connecting unit 430 to remove male connector 436 or male connector 438a from female connector 417. In some embodiments, fluted outer surfaces 436a and 438b each include a plurality of vertical grooves or flutes. The flutes define ridges between adjacent flutes. This configuration allows the orientation of connecting units 410 and 430 to be selected during the assembly process so that the arms 431 and 431a can be configured in a variety of different angular relationships relative to arm 411. As shown, angle D defined by the arms 411 and arm 431 or arm 431a can be almost any degrees with the only limitation on the gearing of the fluted surfaces. The more ridges in inner surfaces 418b and/or fluted outer surface 436a or fluted outer surface 438b, the greater the number of different degrees that can be created. In some embodiments, angle D is between about 0 degrees and about 145 degrees. In some embodiments, angle D is between 0 degrees and 145 degrees.

Figure 22C:
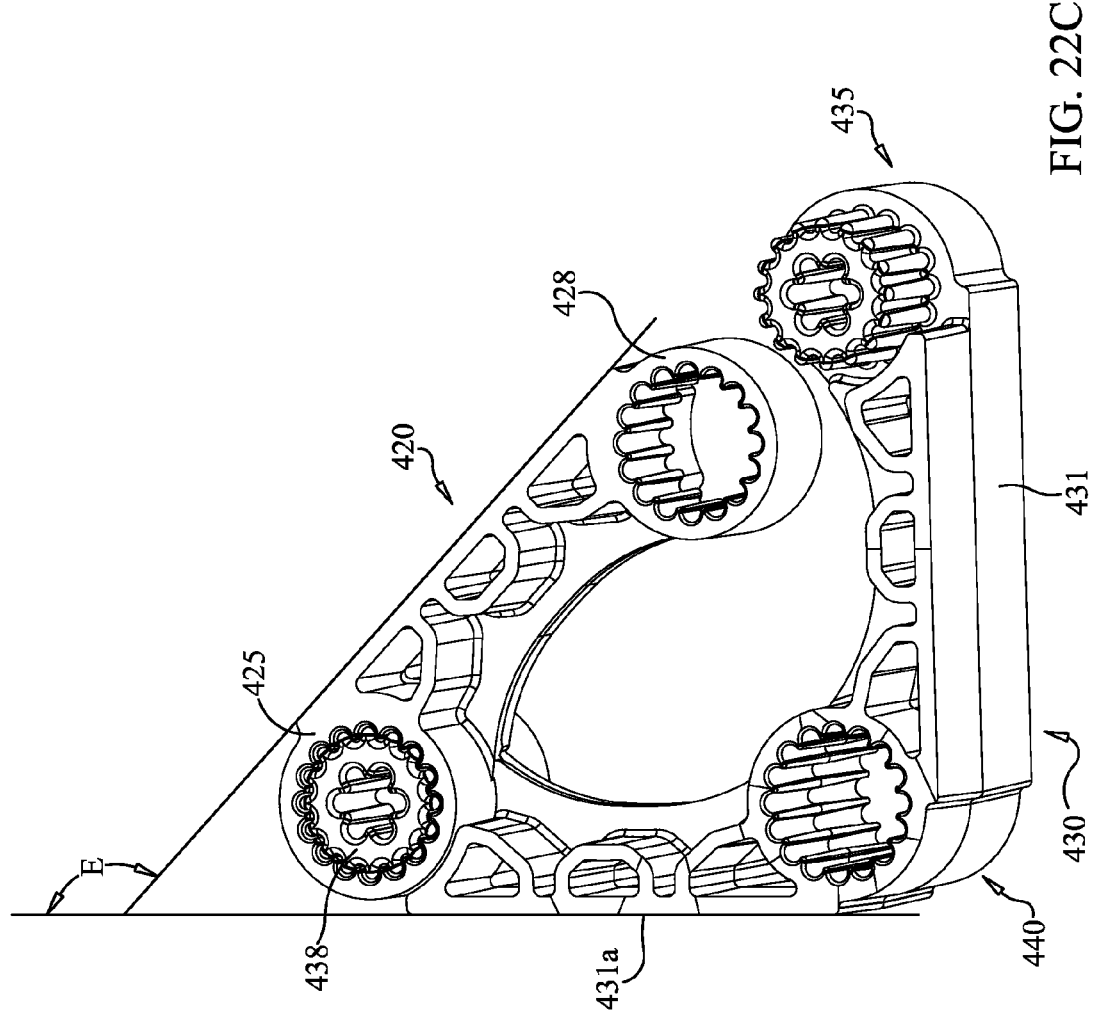
FIG. 22C is a perspective, top view of components of the kit shown in FIG. 19.

Connecting units 430 can be coupled to connecting units 420 by inserting one of male connectors 436, 438a of a connecting unit 430 into female connector 425 of a connecting unit 420 such that fluted outer surface 436a or fluted outer surface 438b of connecting unit 430 mate with the fluted interior surface 428b of connecting unit 420, as shown in FIG. 22C. That is, the flutes of fluted outer surface 436a or fluted outer surface 438b of connecting unit 430 are positioned between the flutes of the fluted interior surface 428b of connecting unit 420 to couple connecting unit 430 to connecting unit 420 in a manner that prevents rotation of connecting unit 420 relative to connecting unit 430. At least a portion of end portion 425 is positioned within the gap between vertical wall 435c and male connector 438a. A planar bottom surface of end portion 425 engages abutments surface 439b.

When male connector 436 or male connector 438a of connecting unit 430 is inserted into female connector 425 of connecting unit 420, female connector 425 encloses at least a portion of male connector 436 or male connector 438a such that male connector 436 or male connector 438a cannot be removed from female connector 425 by moving connecting unit 420 laterally relative to connecting unit 430. Rather, connecting unit 420 must be moved vertically relative to connecting unit 430 to remove male connector 436 or male connector 438a from female connector 425. In some embodiments, fluted outer surfaces 436a and 438b and fluted inner surface 428b each include a plurality of vertical grooves or flutes. The flutes define ridges between adjacent flutes. This configuration allows the orientation of connecting units 420 and 430 to be selected during the assembly process so that the arms 431 and 431a can be configured in a variety of different angular relationships relative to arm 421. As shown, angle D defined by the arms 421 and arm 431 or arm 431a can be almost any degrees with the only limitation on the gearing of the fluted surfaces. The more ridges in inner surfaces 428b and/or fluted outer surface 436a or fluted outer surface 438b, the greater the number of different degrees that can be created. In some embodiments, angle E is between about 0 degrees and about 145 degrees. In some embodiments, angle E is between 0 degrees and 145 degrees.

Figure 24:
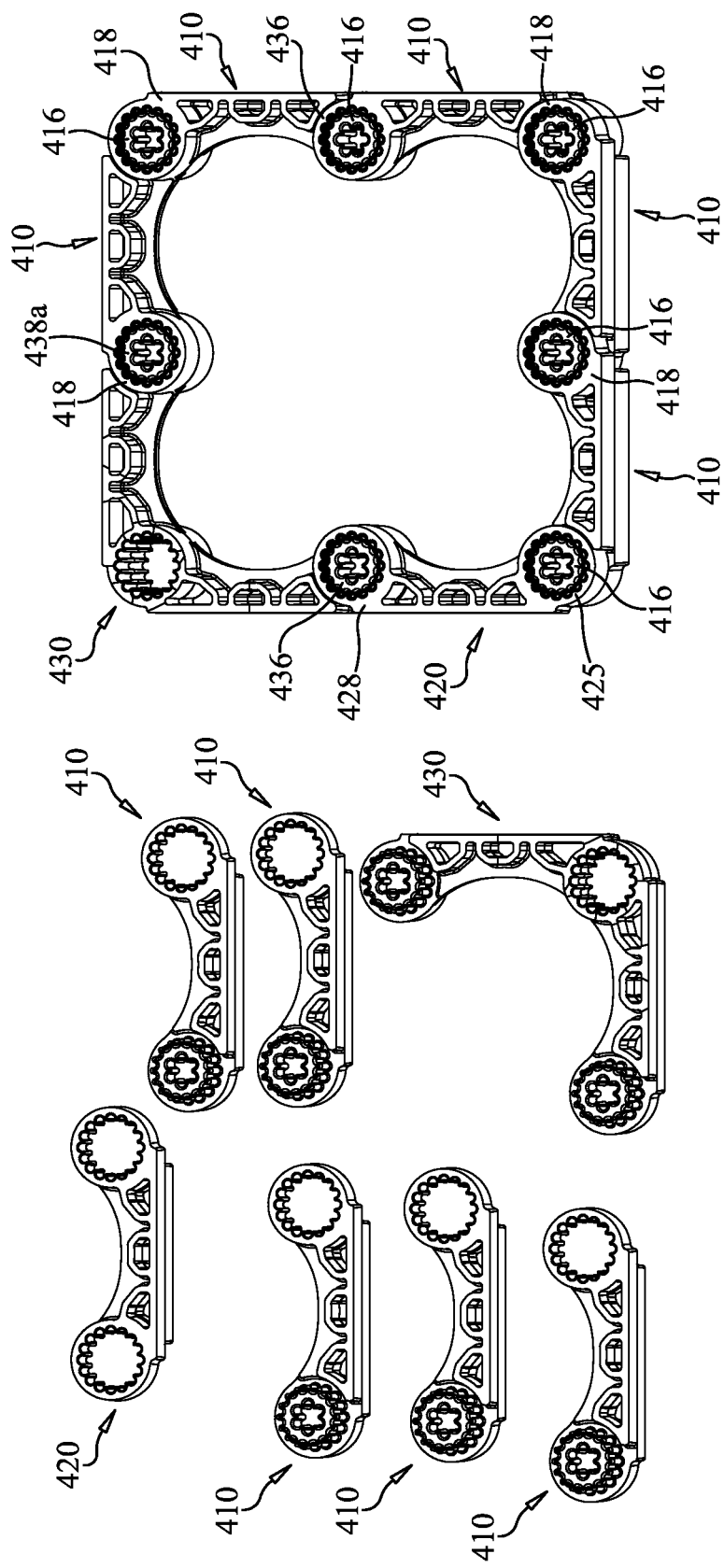
FIG. 24 shows components of the kit shown in FIG. 19 that are assembled to form a frame or enclosure.
Figure 25:
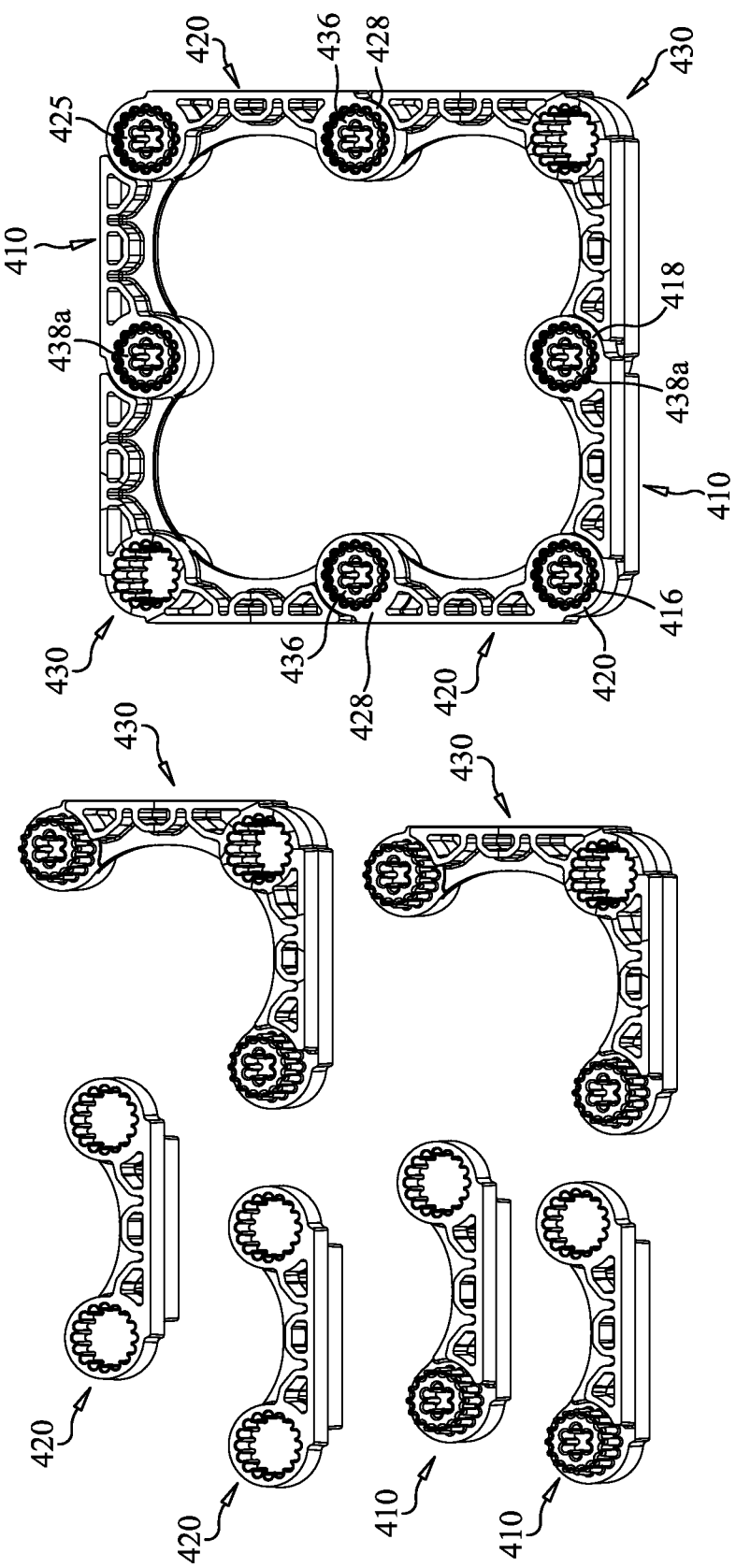
FIG. 25 shows components of the kit shown in FIG. 19 that are assembled to form a frame or enclosure.
Figure 26:
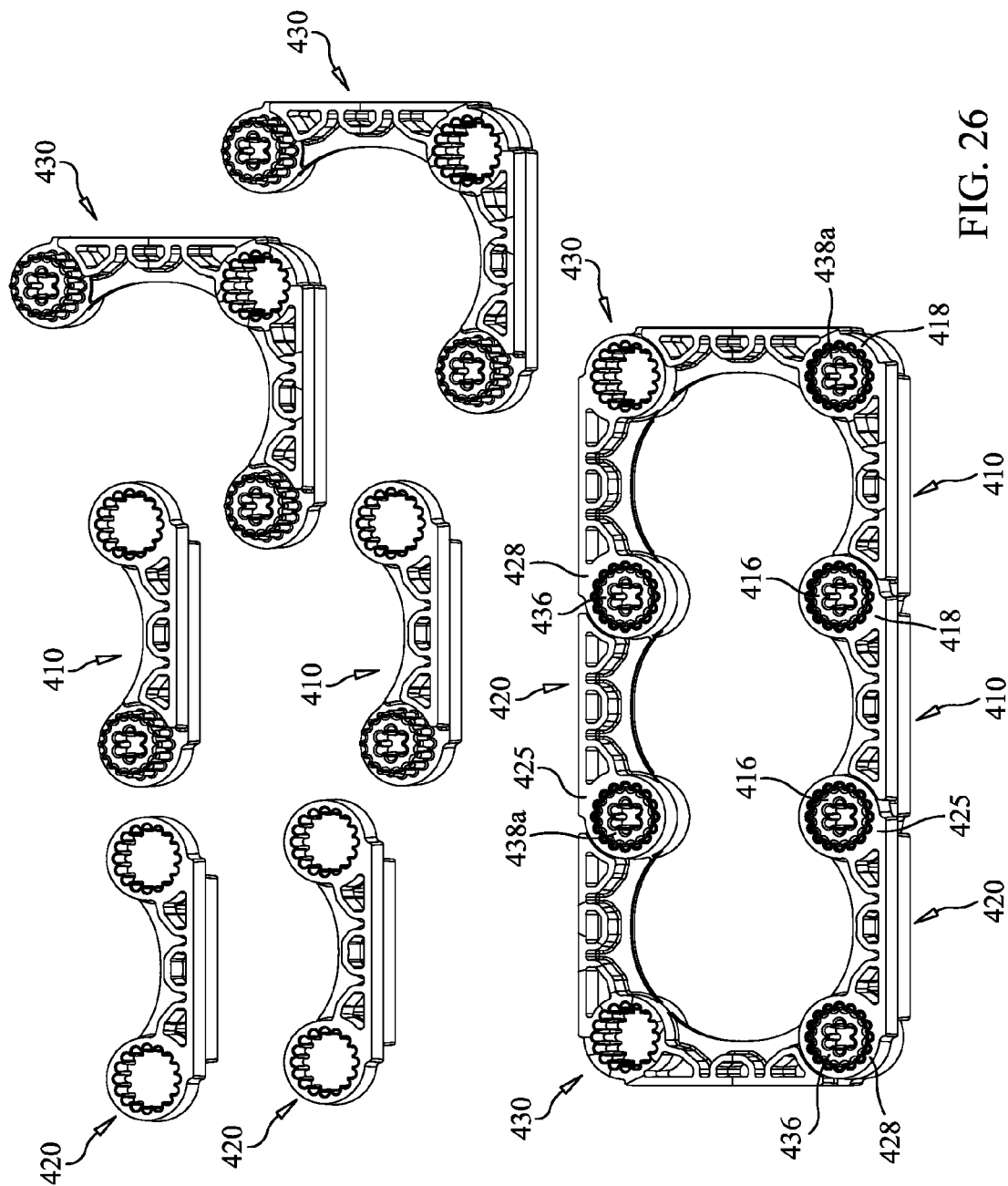
FIG. 26 shows components of the kit shown in FIG. 19 that are assembled to form a frame or enclosure.

The configuration discussed above allows first, second and third connecting units 410, 420, 430 to be combined or coupled to one another to create a frame or enclosure that is capable of enclosing a circumference of an elongated structure of almost any size, without moving the elongated structure. For example, one first connecting unit 410, one second connecting unit 420 and one third connecting unit 430 may be combined in the manner shown in FIG. 23 to produce an assembled frame or enclosure that is square in shape. A larger assembled frame or enclosure that is square in shape may be formed by combining additional first members 410, as shown in FIG. 24, for example. It is envisioned that the number of first, second and third connecting units 410, 420, 430 that are used to form an assembled frame or enclosure having a given size and shape may be varied. For example, the square-shaped assembled frame or enclosure shown in FIG. 24 is formed using five first connecting units 410, one second connecting unit 420 and one third connecting unit 430. However, an assembled frame or enclosure having the same size and shape may also be formed by combining two first connecting units 410, two second connecting units 420 and two third connecting units 430, as shown in FIG. 25. This demonstrates that kit 400 may be used to create an assembled frame or enclosure having a selected size and shape by varying the number of first, second and third connecting units 410, 420, 430 used to create the assembled frame or enclosure. For example, kit 400 may be used to create a rectangular assembled frame or enclosure. Indeed, the two first connecting units 410, two second connecting units 420 and two third connecting units 430 shown in FIG. 25 may be used to create a rectangular assembled frame or enclosure, as shown in FIG. 26. That is, the same components used to create the square-shaped assembled frame or enclosure in FIG. 25 may also be used to create the rectangular assembled frame or enclosure shown in FIG. 26. Similar to the discussion of square-shaped assembled frames or enclosures above, the size of the rectangular assembled frame or enclosure may be varied by the number of first, second and third connecting units 410, 420, 430 used.

Figure 27:
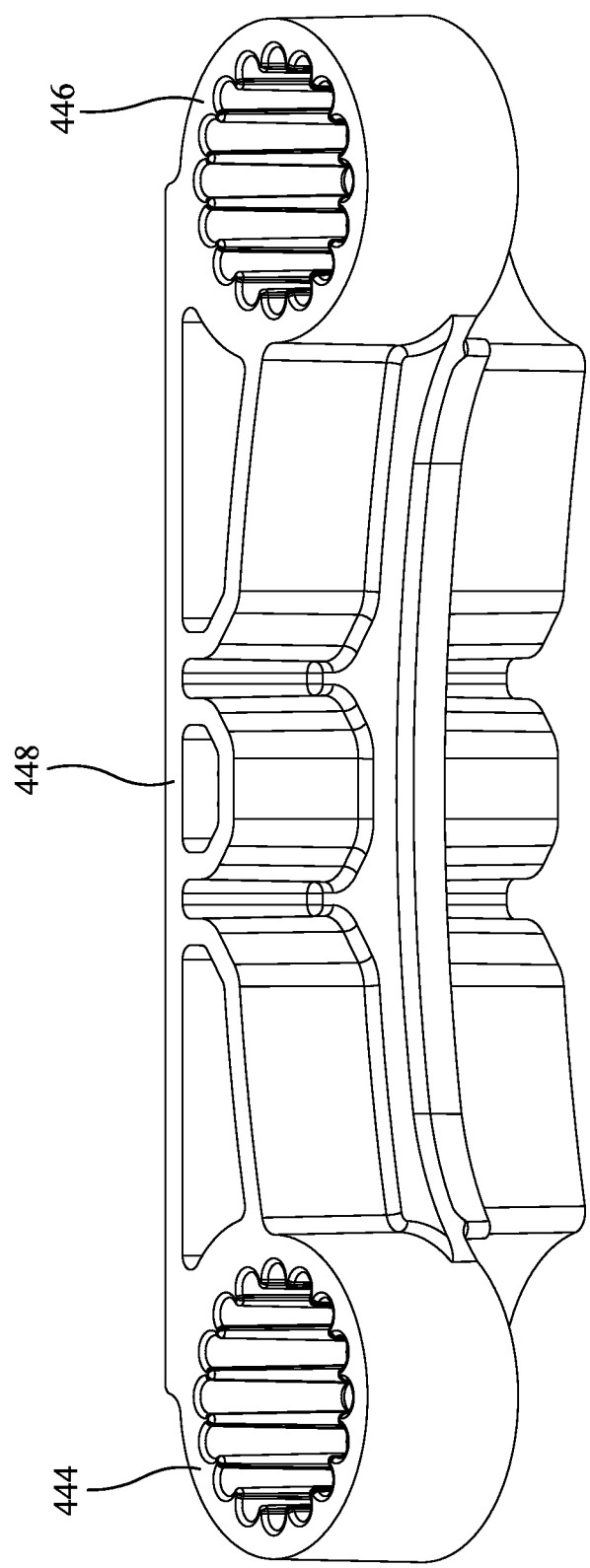
FIG. 27 is a perspective, top view a component of the kit shown in FIG. 19.
Figure 27A:
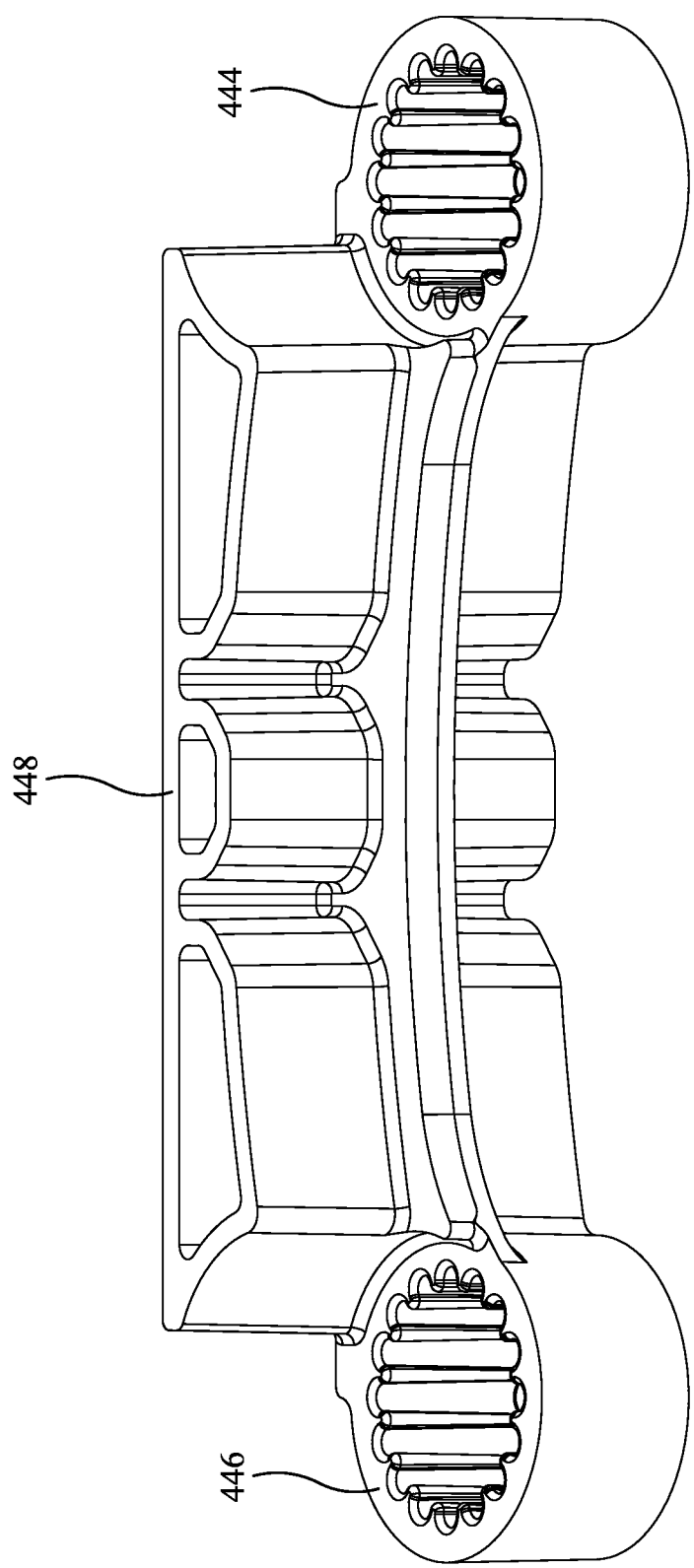
FIG. 27A is a perspective, bottom view a component of the kit shown in FIG. 19.

In some embodiments, kit 400 may include additional components that are similar to first, second and/or third connecting units 410, 420, 430, yet have different maximum lengths in order to provide greater options for sizes and shapes of assembled frames or enclosures that can be formed using kit 400. For example, in one embodiment, shown in FIGS. 27 and 27A, a fourth connecting unit 442 of kit 400 is provided. Kit 400 may include one or a plurality of fourth connecting units 442. Fourth connecting unit 442 is similar to second component 420, but has a maximum length that is greater than that of second component 420. Indeed, fourth connecting unit 442 has an end portion 444 that is similar to end portion 425 and an end portion 446 that is similar to end portion 428. End portions 444, 446 are connected by an arm 448 that is similar to arm 421. However, arm 448 has a length that is greater than that of arm 421 such that end portions 444, 446 are spaced further apart than end portions 425, 428.

Figure 28:
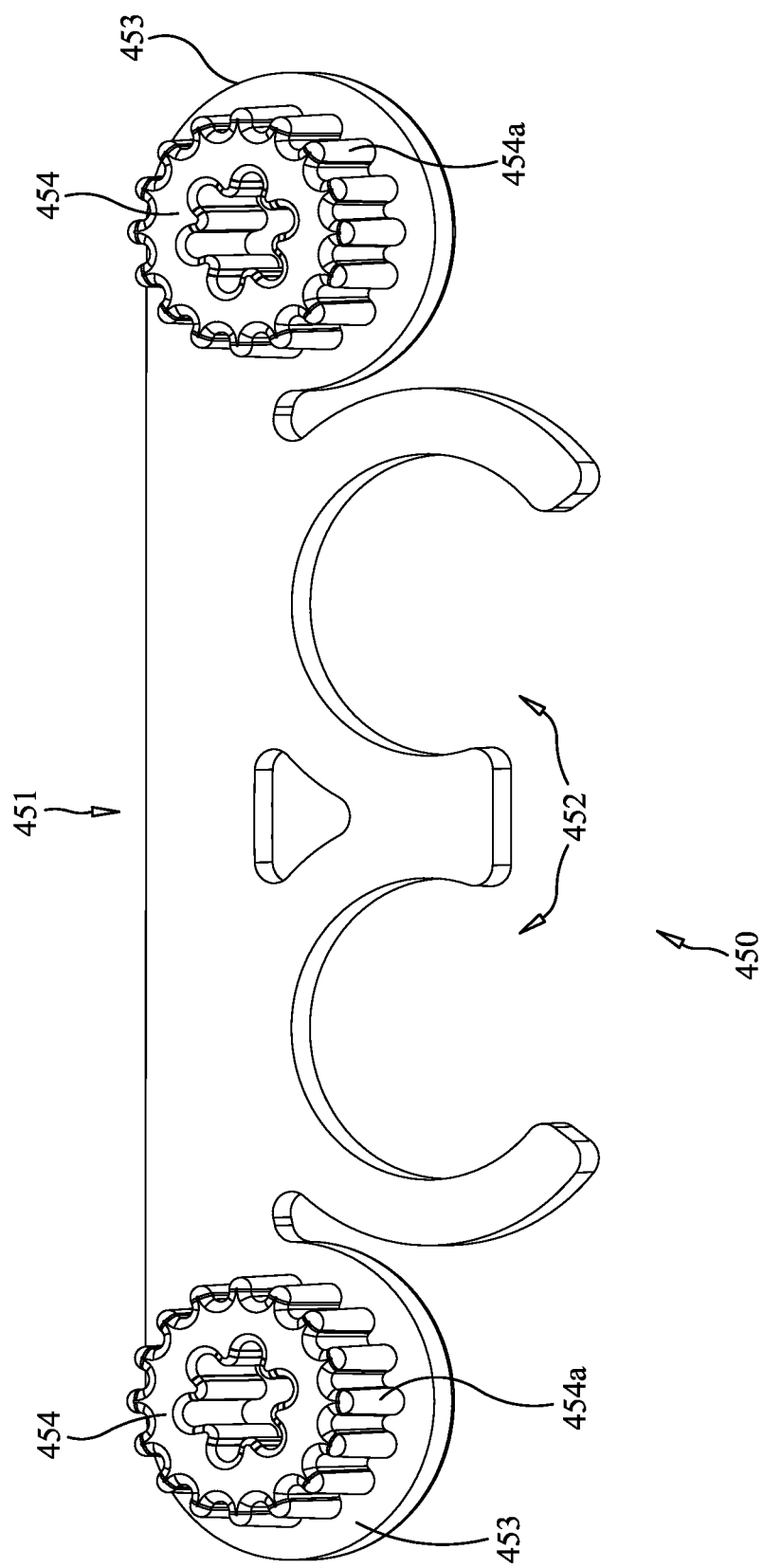
FIG. 28 is a perspective, top view a component of the kit shown in FIG. 19.
Figure 28A:
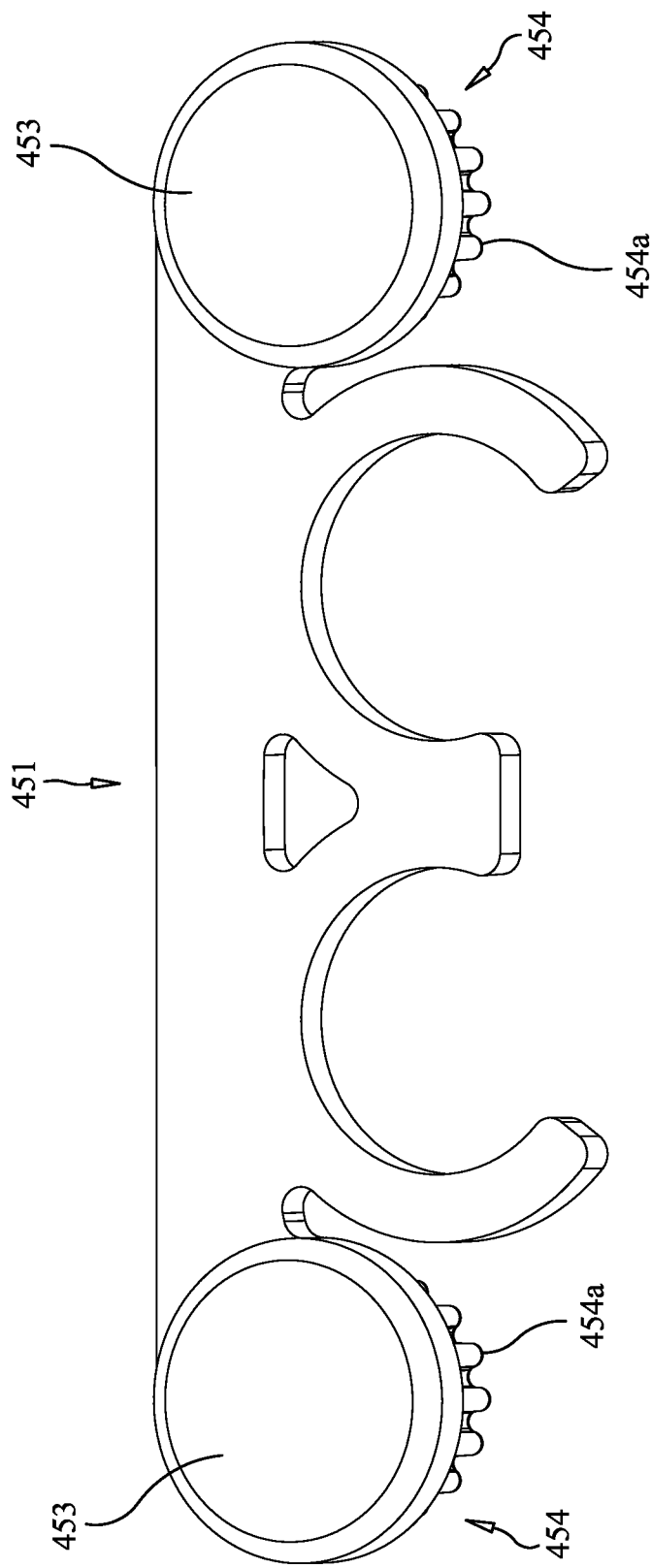
FIG. 28A is a perspective, bottom view a component of the kit shown in FIG. 19.

In some embodiments, kit 400 may include one or a plurality of support brackets 450, as shown in FIGS. 28 and 28A. Support bracket 450 is similar to support bracket 140 and includes a middle support section 451 and opposite end portions 453, each end portion including a male connector 454 having a circumferential fluted surface 454a which is configured and dimensioned to engage a female reception port such as axial recesses 417c, 437c, 439c, as shown in FIG. 29, for example. Middle support section 451 includes one or a plurality of hook portions 452 for supporting wires, cables, tubes, pipe or other electrical or fluid conduits. In some embodiments, hook portions 452 are C-shaped, as shown in FIGS. 28 and 28A. In some embodiments, hook portions 452 have a substantially rectangular or triangular configuration, i.e., having a crenellate or sawtooth structure. In one embodiment, bracket support 450 can include two hook portions, as shown in FIGS. 28 and 28A. In one embodiment, bracket support 450 can include 3 hook portions. In another embodiment, bracket support 450 can include two or more groups of hook portions, each group including from 1 to 5 hook portions, the groups being spaced apart from each other along the length of the middle support section 451. Support bracket 450 is preferably of single piece construction and can be fabricated from any of the materials described below by any of the methods described below.

Figure 30:
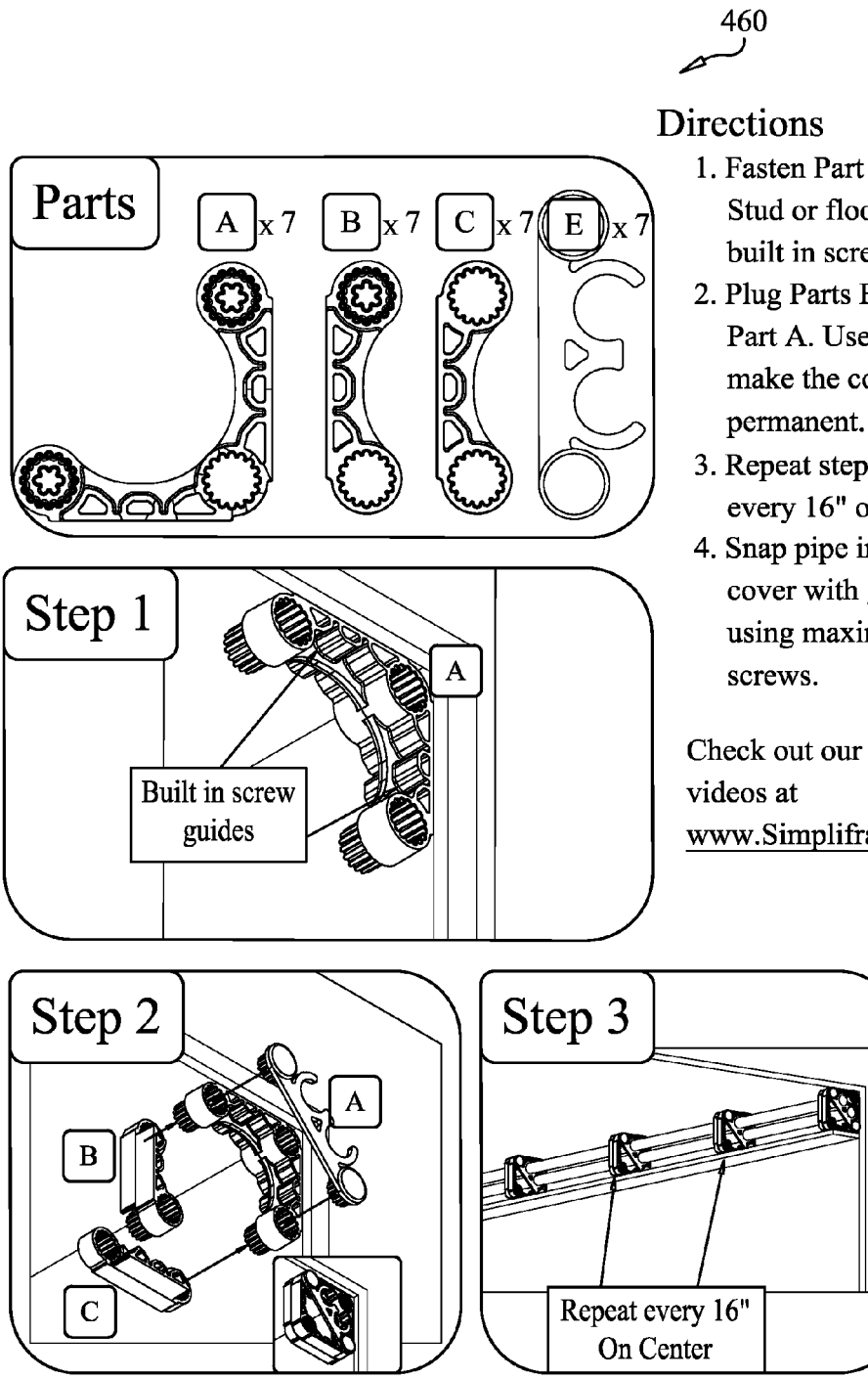
FIG. 30 shows instructions for use with the kit shown in FIG. 19.

In some embodiments, kit 400 includes instructions, such as for example, instructions 460 shown in FIG. 30. In some embodiments, instructions 460 include a list of parts or components included in kit 400. The list of parts or components may include drawings or photographs of the parts or components, such as, for example, drawings or photographs of first, second, third and fourth connecting units 410, 420, 430, 442 and support bracket 450. In some embodiments, instructions 460 include written directions for using kit 400. In some embodiments, the written directions include directions for forming at least one assembled frame or enclosure around an elongated structure, such as, for example, a pipe using kit 400. In some embodiments, the written directions include directions for fastening a portion of a partially assembled frame or enclosure to a surface, such as, for example, a wall or floor joist. In some embodiments, instructions 460 include drawings or pictures that show step by step how to assemble at least one assembled frame or enclosure around an elongated structure, such as, for example, a pipe using kit 400. In some embodiments, the step by step drawings or pictures correlate to the written directions such that the step by step drawings or pictures show how to accomplish what is stated in the written directions. In some embodiments, instructions 460 include a website that a user can access to learn various uses of kit 400.

The components of the modular fastening system can be fabricated from any type of suitable material such as metal, (e.g., stainless steel, aluminum, brass, bronze, etc), or engineering plastics such as high density polyethylene plastic (HDPE), ultra high molecular weight polyethylene plastic (UHMWPE), MC cast nylon 6/66 plastic (Nylon), polytetrafluoroethylene plastic (PTFE), acrylonitrile butadiene styrene (ABS), polycarbonates (PC), polyamides (PA) polybutylene terephthalate (PBT), polyethylene terephthalate (PET), polyphenylene oxide (PPO), polysulphone (PSU), polyetherketone (PEK), polyetheretherketone (PEEK), polyimides, polyphenylene sulfide (PPS), or polyoxymethylene plastic (POM/Acetal). In an embodiment the components of the modular fastening system of the present disclosure are fabricated from HDPE and optionally can include colored pigments or dyes. Indicia can be printed on the components so as to provide directions on how to connect the units.

The components of the fastening system can be produced using any suitable method accepted in the art such as molding, mechanical etching, chemical etching, carving, casting, machining metals, or any other method acceptable in the art that produces the desired shape from the desired material and has the desired specifications. The components of the fastening system can also be made form multiple types of materials made from different methods that are assembled to arrive at the contemplated configurations.

While the above description contains many specifics, these specifics should not be construed as limitations of the present disclosure, but merely as exemplifications of preferred embodiments thereof. Those skilled in the art will envision many other embodiments within the scope and spirit of the present disclosure as defined by the claims appended hereto.

What is claimed is:

1. A modular fastening kit comprising:
   at least one first connecting unit comprising a first end having a male connector and an opposite second end having a female connector;
   at least one second connecting unit comprising a first end having a female connector and an opposite second end having a female connector; and
   at least one third connecting unit comprising a first end extending along a first axis and having a male connector and an opposite second end extending along a second axis and having a male connector, the first axis extending transverse to the second axis,
   wherein the male connectors each have an exterior fluted surface and the female connectors each have an interior fluted surface, the female connectors each being configured and dimensioned to removably receive one of the male connectors,
   wherein the first end of the third connecting unit comprises a second female portion having an interior fluted surface that is coaxial with the exterior fluted surface of the male connector of the first end of the third connecting unit and the second end of the third connecting unit comprises a third female portion having an interior fluted surface that is coaxial with the exterior fluted surface of the male connector of the second end of the third connecting unit.

2. A modular fastening kit as recited in claim 1, wherein the female connector of the first connecting unit extends from a vertical wall of the first connecting unit in a cantilevered configuration.

3. A modular fastening kit as recited in claim 1, wherein the male connector of the first connecting unit extends from a horizontal midline of the first connecting unit to a top surface of the first connecting unit and the female connector of the first connecting unit extends from the horizontal midline to the top surface.

4. A modular fastening kit as recited in claim 3, wherein the first end of the first connecting unit comprises a second female connector having an interior fluted surface that is coaxial with the exterior fluted surface of the male connector of the first connecting unit, the second female connector extending from the horizontal midline to a bottom surface of the first connecting unit.

5. A modular fastening kit as recited in claim 4, wherein the exterior fluted surface of the male connector of the first connecting unit and the interior fluted surface of the second female connector are spaced apart from one another by a horizontal wall that extends along the horizontal midline.

6. A modular fastening kit as recited in claim 1, wherein the female connectors of the second connecting unit each extend from a horizontal midline of the second connecting unit to a top surface of the second connecting unit.

7. A modular fastening kit as recited in claim 1, wherein the female connectors of the second connecting unit extend from vertical walls of the second connecting unit in a cantilevered configuration.

8. A modular fastening kit as recited in claim 1, wherein the male connectors of the third connecting unit each extend from a horizontal midline of the third connecting unit to a top surface of the third connecting unit.

9. A modular fastening kit as recited in claim 1, wherein the third connecting unit comprises an intermediate portion positioned between and connecting the first and second ends of the third connecting unit, the intermediate portion comprising a female connector having an interior fluted surface.

10. A modular fastening kit as recited in claim 9, wherein the interior fluted surface of the intermediate portion extends continuously between opposite top and bottom surfaces of the third connecting unit.

11. A modular fastening kit as recited in claim 1, wherein the second and third female portions each extend from a horizontal midline of the third connecting unit to a bottom surface of the third connecting unit.

12. A modular fastening kit as recited in claim 11, wherein the exterior fluted surface of the male connector of the first end of the third connecting unit and the interior fluted surface of the second female portion are spaced apart from one another by a horizontal wall that extends along the horizontal midline and the exterior fluted surface of the male connector of the second end of the third connecting unit and the interior fluted surface of the third female portion are spaced apart from one another by the horizontal wall.

13. A modular fastening kit as recited in claim 1, further comprising a bracket comprising an elongated body having a male connector at each of two opposite ends, each male connector comprising a cylindrical member having a fluted circumferential outer surface configured to be received in one of the second and third female portions.

14. A modular fastening kit as recited in claim 13, wherein the bracket has a middle section between the two ends of the bracket, the middle section having at least one C-shaped support for an electrical or fluid conduit.

15. A modular fastening kit as recited in claim 13, wherein the bracket has a middle section between the two ends of the bracket, the middle section having a plurality of C-shaped supports each configured to support an electrical or fluid conduit.

16. A modular fastening kit as recited in claim 1, wherein the first axis extends perpendicular to the second axis.

17. A modular fastening kit as recited in claim 1, wherein:
the second connecting unit has a length defined by a distance between the first and second ends of the second connecting unit; and
the kit further comprises at least one fourth connecting unit comprising a first end having a female connector and an opposite second end having a female connector, the female connectors of the fourth connecting unit each having an interior fluted surface, the fourth connecting unit having a length defined by a distance between the first and second ends of the fourth connecting unit that is greater than the length of the second connecting unit.

18. A modular fastening kit comprising:
at least one first connecting unit comprising a first end having a male connector and an opposite second end having a female connector;
at least one second connecting unit comprising a first end having a female connector and an opposite second end having a female connector; and
at least one third connecting unit comprising a first end extending along a first axis and having a male connector and an opposite second end extending along a second axis and having a male connector, the first axis extending transverse to the second axis,
wherein the male connectors each have an exterior fluted surface and the female connectors each have an interior fluted surface, the female connectors each being configured and dimensioned to removably receive one of the male connectors,
wherein the first end of the first connecting unit comprises a second female portion having an interior fluted surface that is coaxial with the exterior fluted surface of the male connector of the first connecting unit and the third connecting unit comprises an intermediate portion positioned between and connecting the first and second ends of the third connecting unit, the intermediate portion comprising a third female portion having an interior fluted surface, and
wherein the kit further comprises a bracket comprising an elongated body having a male connector at each of two opposite ends, each male connector of the bracket comprising a cylindrical member having a fluted circumferential outer surface configured to be received in one of the second and third female portions.

19. A modular fastening kit comprising:
at least one first connecting unit comprising a first end having a male connector and an opposite second end having a female connector;
at least one second connecting unit comprising a first end having a female connector and an opposite second end having a female connector, the second connecting unit having a length defined by a distance between the first and second ends of the second connecting unit;
at least one third connecting unit comprising a first end extending along a first axis and having a male connector and an opposite second end extending along a second axis and having a male connector, the first axis extending transverse to the second axis; and
at least one fourth connecting unit comprising a first end having a female connector and an opposite second end having a female connector, the female connectors of the fourth connecting unit each having an interior fluted surface, the fourth connecting unit having a length defined by a distance between the first and second ends of the fourth connecting unit that is greater than the length of the second connecting unit,
wherein the male connectors each have an exterior fluted surface and the female connectors each have an interior fluted surface, the female connectors each being configured and dimensioned to removably receive one of the male connectors,
wherein the first end of the first connecting unit comprises a second female portion having an interior fluted surface that is coaxial with the exterior fluted surface of the male connector of the first connecting unit and the third connecting unit comprises an intermediate portion positioned between and connecting the first and second ends of the third connecting unit, the intermediate portion comprising a third female portion having an interior fluted surface, and
wherein the kit further comprises a bracket comprising an elongated body having a male connector at each of two opposite ends, each male connector comprising a cylindrical member having a fluted circumferential outer surface configured to be received in one of the second and third female portions.

* * * * *